US008240410B2

(12) United States Patent
Heimbrock et al.

(10) Patent No.: US 8,240,410 B2

(45) Date of Patent: Aug. 14, 2012

(54) PATIENT SUPPORT APPARATUS WITH POWERED WHEEL

(75) Inventors: Richard H. Heimbrock, Cincinnati, OH (US); John D. Vogel, Columbus, OH (US); Thomas M. Webster, Cleves, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 259 days.

(21) Appl. No.: 12/429,349

(22) Filed: Apr. 24, 2009

(65) Prior Publication Data

US 2009/0218150 A1 Sep. 3, 2009

Related U.S. Application Data

(63) Continuation of application No. 11/874,273, filed on Oct. 18, 2007, now Pat. No. 7,530,412, and a continuation of application No. 11/351,720, filed on Feb. 10, 2006, now Pat. No. 7,284,626, and a continuation of application No. 10/998,329, filed on Nov. 23, 2004, now Pat. No. 7,011,172, and a continuation of application No. 10/431,205, filed on May 7, 2003, now Pat. No. 6,902,019, and a continuation of application No. 10/022,552, filed on Dec. 17, 2001, now Pat. No. 6,588,523, and a continuation of application No. 09/434,948, filed on Nov. 5, 1999, now Pat. No. 6,330,926.

(60) Provisional application No. 60/154,089, filed on Sep. 15, 1999.

(51) Int. Cl.

*B60K 1/00* (2006.01)
*A47B 13/00* (2006.01)

(52) U.S. Cl. .................. 180/65.1; 180/65.31; 180/19.1; 5/86.1; 5/601; 5/602; 5/610

(58) Field of Classification Search ........................ None
See application file for complete search history.

(56) References Cited

U.S. PATENT DOCUMENTS

| | | | |
|---|---|---|---|
| 813,213 | A | 2/1906 | Johnson |
| 1,110,838 | A | 9/1914 | Taylor |
| 1,118,931 | A | 12/1914 | Hasley |

(Continued)

FOREIGN PATENT DOCUMENTS

| | | |
|---|---|---|
| CA | 2010543 | 9/1990 |

(Continued)

OTHER PUBLICATIONS

European search report dated Sep. 14, 2010 from EP 10 003 078.2.

(Continued)

*Primary Examiner* — Lesley D. Morris
*Assistant Examiner* — Marlon Arce
(74) *Attorney, Agent, or Firm* — Barnes & Thornburg LLP

(57) ABSTRACT

A patient support apparatus has a first frame and a second frame supported above the first frame and movable relative to the first frame. A plurality of casters are coupled to the first frame. A wheel is movable relative to the first frame between a lowered position engaging the floor and a raised position spaced from the floor. A drive assembly is coupled to the wheel and is operable to drive the wheel to propel the patient support apparatus along the floor. A foot pedal is coupled to the first frame and is movable to raise and lower the wheel relative to the floor.

18 Claims, 11 Drawing Sheets

U.S. PATENT DOCUMENTS 1,598,124 A 8/1926 Evans
1,639,801 A 8/1927 Heise
1,778,698 A 10/1930 Walter
2,224,087 A 12/1940 Reichert
2,513,718 A 7/1950 Gfrorer
2,599,717 A 6/1952 Menzies
2,635,899 A 4/1953 Osbon, Jr.
2,973,823 A 3/1961 Stenz
2,999,555 A 9/1961 Stroud et al.
3,004,768 A 10/1961 Klages
3,112,001 A 11/1963 Wise
3,304,116 A 2/1967 Stryker
3,305,876 A 2/1967 Hutt
3,344,445 A 10/1967 Crawford
3,349,862 A 10/1967 Shirey
3,380,546 A 4/1968 Rabjohn
3,393,004 A 7/1968 Williams
3,404,746 A 10/1968 Slay
3,452,371 A 7/1969 Hirsch
3,464,841 A 9/1969 Putskamp
3,544,127 A 12/1970 Dobson
3,618,966 A 11/1971 Vandervest
3,680,880 A 8/1972 Blaauw
3,757,180 A 9/1973 Subler
3,770,070 A 11/1973 Smith
3,802,524 A 4/1974 Seidel
3,814,199 A 6/1974 Jones
3,820,838 A 6/1974 Limpach
3,841,142 A 10/1974 Aisuta
3,869,011 A 3/1975 Jensen
3,872,945 A 3/1975 Hickman et al.
3,876,024 A 4/1975 Shieman et al.
3,905,436 A 9/1975 Karchak
3,907,051 A 9/1975 Weant
3,929,354 A 12/1975 Elkins
3,938,608 A 2/1976 Folco-Zambelli
3,995,024 A 11/1976 Hawking et al.
4,067,409 A 1/1978 DiMatteo
4,137,984 A 2/1979 Jennings et al.
4,164,355 A 8/1979 Eaton et al.
4,167,221 A 9/1979 Edmonson et al.
4,175,632 A 11/1979 Lassanske
4,175,783 A 11/1979 Pioth
4,186,456 A 2/1980 Huempfner
4,221,273 A 9/1980 Finden
4,274,503 A 6/1981 Mackintosh
4,275,797 A 6/1981 Johnson
4,295,555 A 10/1981 Kamm
4,380,175 A 4/1983 Griffen
4,415,049 A 11/1983 Wereb
4,415,050 A 11/1983 Nishida et al.
4,432,247 A 2/1984 Takeno
4,439,879 A 4/1984 Werner
4,444,284 A 4/1984 Montemurro
4,475,611 A 10/1984 Fisher
4,475,613 A 10/1984 Walker
4,511,825 A 4/1985 Klimo
4,513,832 A 4/1985 Engman
4,566,707 A 1/1986 Nitzberg
4,570,739 A 2/1986 Kramer
4,584,989 A * 4/1986 Stith ................................ 600/18
4,614,246 A 9/1986 Masse et al.
4,629,242 A 12/1986 Schrager
4,646,860 A 3/1987 Owens et al.
4,723,808 A 2/1988 Hines
4,724,555 A 2/1988 Poehner et al.
4,759,418 A 7/1988 Goldenfeld et al.
4,771,840 A 9/1988 Keller
4,807,716 A 2/1989 Hawkins
4,811,988 A 3/1989 Immel
4,848,504 A 7/1989 Olson
4,874,055 A 10/1989 Beer
4,895,040 A 1/1990 Soederberg
4,906,906 A 3/1990 Lautzenhiser et al.
4,915,184 A 4/1990 Watkins
4,922,574 A 5/1990 Heiligenthal et al.
4,938,493 A 7/1990 Okuda
4,949,408 A 8/1990 Trkla
4,978,899 A 12/1990 Lautzenhiser
4,979,582 A 12/1990 Forster
4,981,309 A 1/1991 Froeschle et al.
5,021,917 A 6/1991 Pike
5,060,327 A 10/1991 Celestina et al.
5,060,959 A 10/1991 Davis et al.
5,069,465 A 12/1991 Stryker et al.
5,083,625 A * 1/1992 Bleicher ...................... 180/65.1
5,084,922 A 2/1992 Louit
5,094,314 A 3/1992 Hayata
5,117,521 A 6/1992 Foster et al.
5,121,806 A 6/1992 Johnson
5,156,226 A 10/1992 Boyer et al.
5,181,762 A 1/1993 Beumer
5,187,824 A 2/1993 Stryker
5,193,633 A 3/1993 Ezenwa
5,201,819 A 4/1993 Shiraishi et al.
5,222,567 A 6/1993 Broadhead et al.
5,232,065 A 8/1993 Cotton
5,244,225 A 9/1993 Frycek
5,251,429 A 10/1993 Minato et al.
5,255,403 A 10/1993 Ortiz
5,275,248 A 1/1994 Finch
5,279,010 A 1/1994 Ferrand et al.
5,284,218 A 2/1994 Rusher, Jr.
5,293,950 A 3/1994 Marliac
5,307,889 A 5/1994 Bohannan
5,322,306 A 6/1994 Coleman
5,337,845 A 8/1994 Foster et al.
5,348,326 A * 9/1994 Fullenkamp et al. ...... 280/43.17
5,358,265 A 10/1994 Yaple
5,366,036 A 11/1994 Perry
5,377,372 A 1/1995 Rudolf et al.
5,381,572 A 1/1995 Park
5,388,294 A 2/1995 Reeder
5,406,778 A 4/1995 Lamb et al.
5,439,069 A 8/1995 Beeler
5,445,233 A 8/1995 Fernie et al.
5,447,317 A 9/1995 Gehlsen et al.
5,447,935 A 9/1995 Hubele et al.
5,450,639 A 9/1995 Weismiller et al.
5,477,935 A 12/1995 Chen
5,495,904 A 3/1996 Zwaan et al.
5,526,890 A 6/1996 Kadowaki
5,531,030 A 7/1996 Dale, Jr.
5,535,465 A 7/1996 Hannant
5,540,297 A 7/1996 Meier
5,542,690 A 8/1996 Kozicki
5,562,091 A 10/1996 Foster et al.
5,570,483 A 11/1996 Williamson
5,580,207 A 12/1996 Kiebooms et al.
5,613,252 A 3/1997 Yu et al.
5,648,708 A 7/1997 Littlejohn
5,669,086 A 9/1997 Garman
5,687,437 A 11/1997 Goldsmith
5,687,438 A 11/1997 Biggie
5,690,185 A 11/1997 Sengel
5,697,623 A 12/1997 Bermes et al.
5,726,541 A 3/1998 Glenn
5,730,243 A 3/1998 Koike
5,732,786 A 3/1998 Fujigaki
5,737,782 A 4/1998 Matsuura et al.
5,746,282 A 5/1998 Fujiwara et al.
5,749,424 A 5/1998 Reimers
5,771,988 A 6/1998 Kikutani
5,775,456 A 7/1998 Reppas
5,778,996 A 7/1998 Prior et al.
5,806,111 A 9/1998 Heimbrock et al.
5,809,755 A 9/1998 Velke et al.
5,810,104 A 9/1998 Campbell
5,826,670 A 10/1998 Nan
5,839,528 A 11/1998 Lee
5,854,622 A 12/1998 Brannon
5,862,549 A 1/1999 Morton et al.
5,865,426 A 2/1999 Kazerooni
5,906,017 A 5/1999 Ferrand et al.
5,915,487 A 6/1999 Splittstoesser et al.
5,921,338 A 7/1999 Edmondson
5,927,414 A 7/1999 Kan et al.

| | | | | |
|---|---|---|---|---|
| 5,934,694 | A | 8/1999 | Schugt et al. | |
| 5,937,959 | A | 8/1999 | Fujii et al. | |
| 5,937,961 | A | 8/1999 | Davidson | |
| 5,944,131 | A | 8/1999 | Schaffner et al. | |
| 5,959,538 | A | 9/1999 | Schousek | |
| 5,961,561 | A | 10/1999 | Wakefield | |
| 5,964,313 | A | 10/1999 | Guy | |
| 5,964,473 | A | 10/1999 | Degonda et al. | |
| 5,971,091 | A | 10/1999 | Kamen et al. | |
| 5,983,425 | A | 11/1999 | DiMucci et al. | |
| 5,987,671 | A * | 11/1999 | Heimbrock et al. | 5/600 |
| 5,988,304 | A | 11/1999 | Behrendts | |
| 5,996,149 | A | 12/1999 | Heimbrock et al. | |
| 6,000,486 | A | 12/1999 | Romick et al. | |
| 6,016,580 | A | 1/2000 | Heimbrock et al. | |
| 6,035,561 | A | 3/2000 | Paytas et al. | |
| 6,045,262 | A | 4/2000 | Igeta et al. | |
| 6,050,356 | A | 4/2000 | Takeda et al. | |
| 6,059,060 | A | 5/2000 | Kanno et al. | |
| 6,059,301 | A | 5/2000 | Skarnulis | |
| 6,062,328 | A | 5/2000 | Campbell et al. | |
| 6,065,555 | A | 5/2000 | Yuki et al. | |
| 6,070,679 | A | 6/2000 | Berg et al. | |
| 6,073,285 | A | 6/2000 | Ambach et al. | |
| 6,076,208 | A | 6/2000 | Heimbrock et al. | |
| 6,076,209 | A | 6/2000 | Paul | |
| 6,098,732 | A | 8/2000 | Romick et al. | |
| 6,105,348 | A | 8/2000 | Turk et al. | |
| 6,109,379 | A | 8/2000 | Madwed | |
| 6,125,957 | A | 10/2000 | Kauffmann | |
| 6,131,690 | A | 10/2000 | Galando et al. | |
| 6,148,942 | A | 11/2000 | Mackert, Sr. | |
| 6,154,690 | A | 11/2000 | Coleman | |
| 6,173,799 | B1 | 1/2001 | Miyazaki et al. | |
| 6,178,565 | B1 | 1/2001 | Franco | |
| 6,178,575 | B1 * | 1/2001 | Harada | 5/600 |
| 6,179,074 | B1 | 1/2001 | Scharf | |
| 6,205,601 | B1 | 3/2001 | Nessmann et al. | |
| 6,209,670 | B1 | 4/2001 | Fernie et al. | |
| 6,227,320 | B1 | 5/2001 | Eggert et al. | |
| 6,240,579 | B1 * | 6/2001 | Hanson et al. | 5/86.1 |
| 6,256,812 | B1 | 7/2001 | Bartow et al. | |
| 6,286,165 | B1 | 9/2001 | Heimbrock et al. | |
| 6,296,261 | B1 | 10/2001 | deGoma | |
| 6,321,878 | B1 * | 11/2001 | Mobley et al. | 188/1.12 |
| 6,330,926 | B1 | 12/2001 | Heimbrock et al. | |
| 6,343,665 | B1 | 2/2002 | Eberlein et al. | |
| 6,390,213 | B1 | 5/2002 | Bleicher | |
| 6,505,359 | B2 | 1/2003 | Heimbrock et al. | |
| 6,668,402 | B2 | 12/2003 | Heimbrock | |
| 6,668,965 | B2 | 12/2003 | Strong | |
| 6,725,956 | B1 | 4/2004 | Lemire | |
| 6,749,034 | B2 | 6/2004 | Vogel et al. | |
| 6,752,224 | B2 | 6/2004 | Hopper et al. | |
| 6,772,850 | B1 | 8/2004 | Waters et al. | |
| 6,772,860 | B1 | 8/2004 | Nelson | |
| 6,877,572 | B2 | 4/2005 | Vogel et al. | |
| 6,945,697 | B2 | 9/2005 | Schuster | |
| 7,011,172 | B2 | 3/2006 | Heimbrock et al. | |
| 7,014,000 | B2 | 3/2006 | Kummer et al. | |
| 7,083,012 | B2 | 8/2006 | Vogel et al. | |
| 7,090,041 | B2 | 8/2006 | Vogel et al. | |
| 7,195,253 | B2 | 3/2007 | Vogel et al. | |
| 7,273,115 | B2 | 9/2007 | Kummer et al. | |
| 7,284,626 | B2 | 10/2007 | Heimbrock et al. | |
| 7,407,024 | B2 | 8/2008 | Vogel et al. | |
| 2002/0138905 | A1 | 10/2002 | Bartlett et al. | |
| 2002/0152555 | A1 | 10/2002 | Gallant et al. | |
| 2003/0159861 | A1 | 8/2003 | Hopper et al. | |
| 2004/0133982 | A1 | 7/2004 | Horitani et al. | |
| 2004/0159473 | A1 | 8/2004 | Vogel et al. | |
| 2005/0199430 | A1 | 9/2005 | Vogel et al. | |
| 2005/0236193 | A1 | 10/2005 | Vogel et al. | |

FOREIGN PATENT DOCUMENTS

| | | | |
|---|---|---|---|
| DE | 295 18 502 | | 1/1997 |
| DE | 199 21 503 | | 4/2000 |
| EP | 0 062 180 | A2 | 10/1982 |
| EP | 0 093 700 | | 11/1983 |
| EP | 0 173 393 | | 3/1986 |
| EP | 0 173 393 | A2 | 3/1986 |
| EP | 0 329 504 | B1 | 8/1989 |
| EP | 0 338 689 | | 10/1989 |
| EP | 0 352 647 | B1 | 1/1990 |
| EP | 0 403 202 | B1 | 12/1990 |
| EP | 0 420 263 | | 4/1991 |
| EP | 0 630 637 | | 12/1994 |
| EP | 0 653 341 | A1 | 5/1995 |
| EP | 0 707 841 | | 4/1996 |
| EP | 0 776 637 | | 6/1997 |
| FR | 2 735 019 | | 12/1996 |
| GB | 415450 | | 8/1934 |
| GB | 2 285 393 | | 7/1995 |
| JP | 46-31490 | | 9/1971 |
| JP | 47-814 | | 8/1972 |
| JP | 47-17495 | | 10/1972 |
| JP | 47-44792 | | 6/1973 |
| JP | 48-44792 | | 6/1973 |
| JP | 48-44793 | | 6/1973 |
| JP | 48-54494 | | 7/1973 |
| JP | 48-54495 | | 7/1973 |
| JP | 48-29855 | | 8/1974 |
| JP | 51-20491 | | 2/1976 |
| JP | 53-9091 | | 1/1978 |
| JP | 53-96397 | | 8/1978 |
| JP | 56-68523 | | 6/1981 |
| JP | 56-68524 | | 6/1981 |
| JP | 56-73822 | | 6/1981 |
| JP | 57-157325 | | 10/1982 |
| JP | 57-187521 | | 11/1982 |
| JP | 59-37946 | | 3/1984 |
| JP | 59-183756 | | 10/1984 |
| JP | 59-186554 | | 10/1984 |
| JP | 60-12058 | | 1/1985 |
| JP | 60-12059 | | 1/1985 |
| JP | 60-21751 | | 2/1985 |
| JP | 60-31749 | | 2/1985 |
| JP | 60-31750 | | 2/1985 |
| JP | 60-31751 | | 2/1985 |
| JP | 60-122561 | | 7/1985 |
| JP | 60-188152 | | 9/1985 |
| JP | 60-188153 | | 9/1985 |
| JP | 60-188727 | | 11/1986 |
| JP | 62-60433 | | 4/1987 |
| JP | 64-17231 | | 1/1989 |
| JP | 2-84961 | | 3/1990 |
| JP | 4-108525 | | 9/1992 |
| JP | 6-50631 | | 7/1994 |
| JP | 6-237959 | | 8/1994 |
| JP | 6-30404 | | 11/1994 |
| JP | 7-136215 | | 5/1995 |
| JP | 8-112244 | | 5/1996 |
| JP | 8-317953 | | 12/1996 |
| JP | 9-24071 | | 1/1997 |
| JP | 9-38154 | | 2/1997 |
| JP | 9-38155 | | 2/1997 |
| JP | 10-146364 | | 6/1998 |
| JP | 10-181609 | | 7/1998 |
| JP | 10-305705 | | 11/1998 |
| JP | 12-107230 | | 4/2000 |
| JP | 200-118407 | | 4/2000 |
| JP | 12-175974 | | 6/2000 |
| WO | 82-01313 | | 4/1982 |
| WO | 87/07830 | | 12/1987 |
| WO | 94/16935 | | 8/1994 |
| WO | 94/21505 | | 9/1994 |
| WO | 95/20514 | | 8/1995 |
| WO | 96/07555 | | 3/1996 |
| WO | 96/33900 | | 10/1996 |
| WO | 97/39715 | | 10/1997 |
| WO | 00/37222 | | 6/2000 |
| WO | WO 00/51830 | | 9/2000 |
| WO | WO 01/19313 | A1 | 3/2001 |
| WO | WO 01/85084 | A1 | 11/2001 |

OTHER PUBLICATIONS

Complaint and Demand for Jury Trail, Apr. 4, 2011, *Hill-Rom Services, Inc. et al.* v. *Stryker Corporation et al.*, U. S. District Court for the Southern District of Indiana, Indianapolis Division, Case No. 1:11-cv58JMS-DML.
Defendant Stryker's Answer, Affirmative Defenses and Counterclaims to Plaintiff Hill-Rom's Compliant, Jun. 6, 2011, *Hill-Rom Services, Inc. et al.* v. *Stryker Corporation et al.*, U. S. District Court for the Southern District of Indiana, Indianapolis Division, Case No. 1:11-cv58JMS-DML.
Case Management Plan, Jul. 28, 2011, *Hill-Rom Services, Inc. et al.* v. *Stryker Corporation et al.*, U. S. District Court for the Southern District of Indiansa, Indianapolis Division, Case No. 1:11-CV58JMS-DML.
Plaintiff Hill-Rom's Answer and Affirmative Defenses to Defendant Stryker's Counterclaims; Filed Jun. 27, 2011, *Hill-Rom Services, Inc et al.* v. *Stryker Corporation et al.*, U. S. District Court for the Southern District of Indiana, Indianapolis Division, Case No. 1:11-cv58JMS-DML.
Stryker's Preliminary Interference-In-Fact & Priority Contentions, Dec. 12, 2011, *Hill-Rom Services, Inc. et al.* v. *Stryker Corporation et al.*, U. S. District Court for the Southern District of Indiana, Indianapolis Division, Case No. 1:11-CV-0458-JMS-DML.
Stryker's Responses to Hill-Rom's First Set of Interrogatories, Aug. 1, 2011 *Hill-Rom Services, Inc. et al.* v. *Stryker Corporation et al.*, U. S. District Court for the Southern District of Indiana, Indianapolis Division, Case No. 1:11-CV-0458-JMS-DKL.
Stryker's Preliminary Invalidity Contentions For U.S. Patents Nos. 6,993,799 and 7,644,458 dated Feb. 24, 2012.
Stryker's Preliminary Invalidity Contentions For U.S. Patents Nos. 6,588,523, 6,902,019, 7,011,172 and 7,284626, dated Feb. 24, 2012.
Stryker's Preliminary Invalidity Contentions For U.S. Patents Nos. 7,090,041, 7,273,115, 7,407,024 and 7,8928,092, dated Feb. 24, 2012.
Sanders, DA, et al. "Computer Systems and Strategies to Assist a Disabled Person in Navigating a Powered Wheelchair Through a Doorway," The Institution of Electrical Engineers, 1997, 4 pages.
Sokira, Thomas J. et al. "Brushless DC Motors Electronics Commutation and Controls," Tab Brooks, Inc., 1990, 8 pages.
Smith, Robert E., "Digital Controls for an Omnidirectional Wheelchair," , American Control Conference, 1983, 4 pages.
Levine, Simon P. et al., "The NavChair Assistive Wheelchair Navigation System,", IEEE Transactions on Rehabilitation Engineering, vol. 7, No. 4, Dec. 1999.
Roy, et al. "Techincal Note: Five-wheel unicycle system" Journal of the International Federation for Medical & Biological Engineering, vol. 23, No. 6, Nov. 1985.
Kassler, Michael, Robotics for health care: a review of the literature:, Robotics (1993) vol. 11, pp. 495-516.
Finlay, Patrick A., "PAM: A Robotic Solution to Patient Handling", Industrial Robot, International Quarterly, vol. 19, No. 3, 1992, pp. 13-15.
Finlay, Patrick A. Advanced Medical Robotics in the UK:, Principal Engineer and Divisional Manager, Pulver Systems Ltd. pp. 1-4.
Gray, Professor J. O., "The National Advanced Robotics Research Center, Core Technical Programme" IEE Colloquium on Advanced Robotic Initiatives in the UK, pp. 1-8.
Hagan, Karen et al., "The Design of a Wheelchair Mounted Robot," The Institution of Electrical Engineers, pp. 1-6.
Hashino, Satoshi, "Aiding robots," Advanced Robotics, vol. 7, No. 1. pp. 97-103 (1993).
Beaty, H. Wayne et al., "Electric Motor Handbook,"McGraw-Hill Handbooks, 1998.
Cameron, Stephen, "Advanced Robotics at Oxford University," IEE Colloquium on Advanced Robotic Initiatives in the UK, 1991, pp. 1-3.
Cooper, Rory A., "Intelligent Control of Power Wheelchairs,", IEEE Engineering in Medicine and Biology, Jul./Aug. 1995 pp. 423-431.
Finlay, P.A., "Feasibility Study Report—Applications for Advanced Robotics in Medicine and HealthCare," Fulmer Research Limited, Slough UK, Report No. R1175/2, Jan. 1988.
Nagel et al., "Proceedings of the Annual International Conference of the IEEE Engineering in Medicine and Biology Society," vol. 13, 1991.
Stryker Medical 2040 Zoom Critical Care Bed, Operations Manual, Sep. 1999.
Stryker Medical Zoom Critical Care Bed, Model 2040, Maintenance Manual, Rev. A, Oct. 1999.
Stryker Medical Zoom Patient Transport Frame, Model 2040, Operations Manual.
Stryker Medical Zoom Patient Transport Frame, Model 2040, Maintenance Manual, Rev. D, Jul. 2000.
Stryker Medical Renaissance Series, 1060 OB/GYN Trauma Bed, Maintenance Manual, Mar. 1992.
Stryker Medical Renaissance Series, 1060 OB/GYN Trauma Bed, Operations Manual, Mar. 1992.
Findlay, Patrick A., "Medical Robots in Intensive Care," Intensive Care World, Mar. 7, 1990.
Findlay, Patrick A., "Robotic Systems For Health and Retirement Care," Proc Ann Conf International Federation Robotics, 1994.
"Dart Controls, Inc, Instructional Manual, HBP Control Series,"LTHBP (IM-HBP-0198).
"From Muscle Power to Motor Power," Midlands News, Omaha World Herald, Business 43, Sunday, Jan. 6, 1996, p. 43.
2030 Epic Critical Care Bed Operations Manual, Jul. 1998.
Curtis PMC 1208 Transistorized Motor Controllers Installation/Operation Manual, Rev. 1.

* cited by examiner

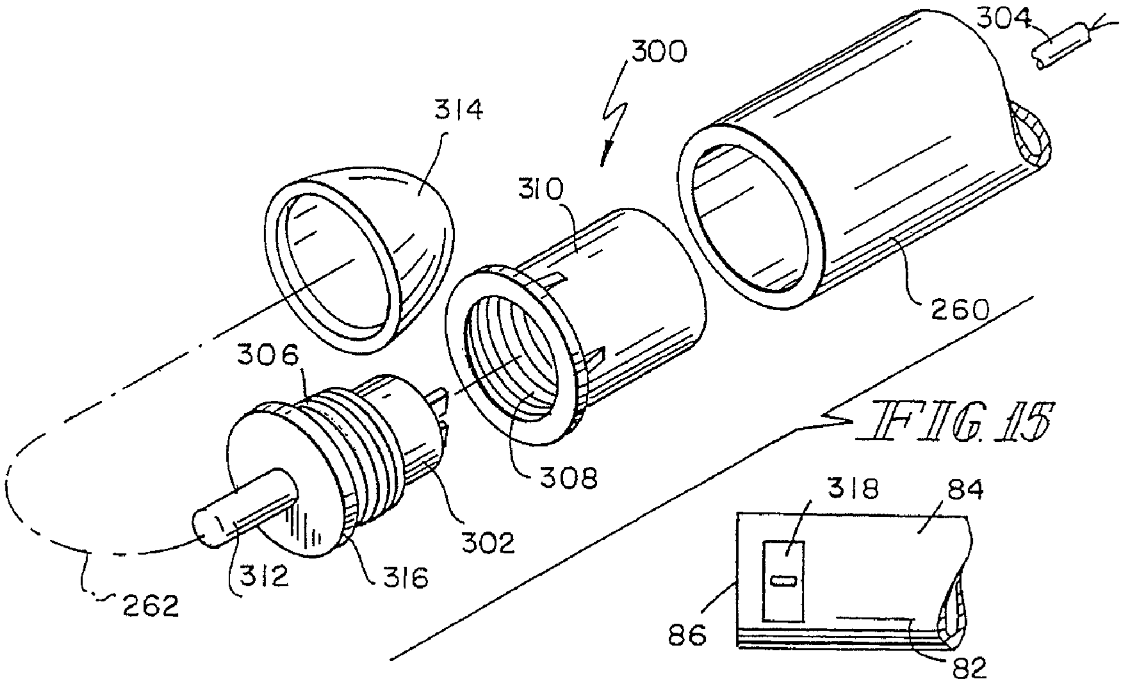
FIG. 15
FIG. 15a
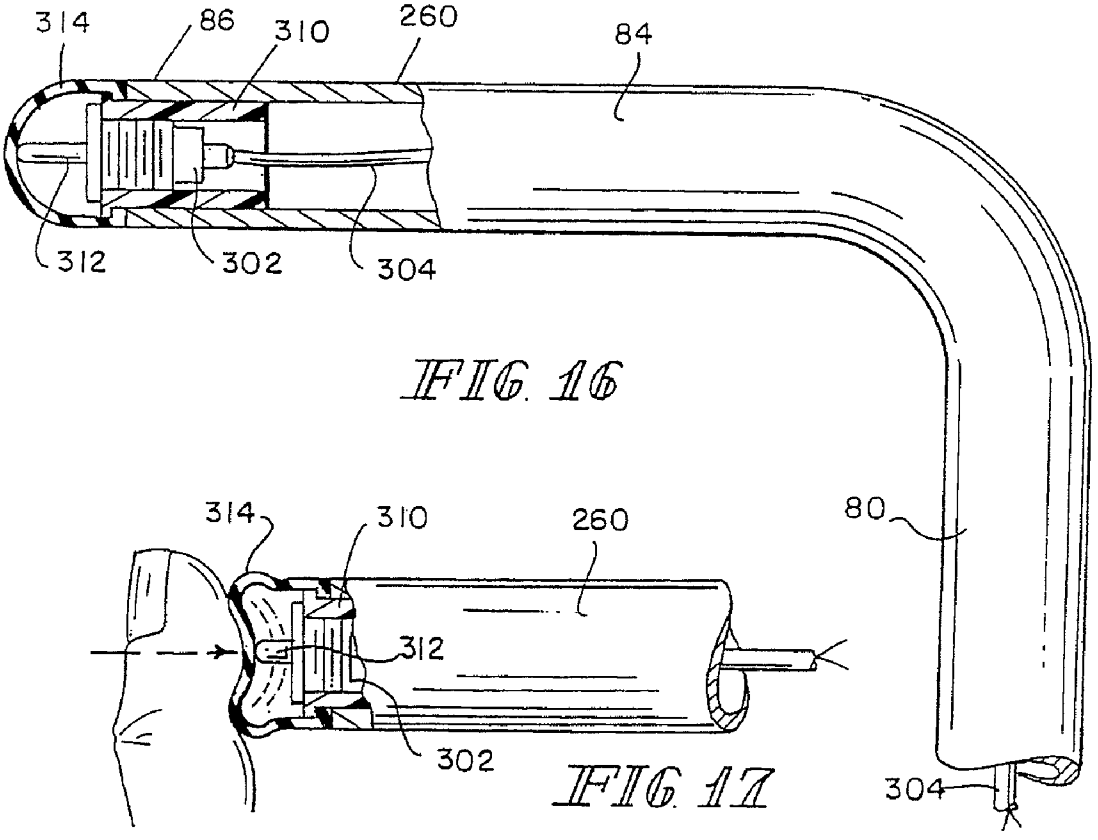
FIG. 16
FIG. 17

PATIENT SUPPORT APPARATUS WITH POWERED WHEEL

CROSS-REFERENCE TO RELATED APPLICATIONS

This application is a continuation of U.S. patent application Ser. No. 11/874,273, filed Oct. 18, 2007, issued as U.S. Pat. No. 7,530,412 on May 12, 2009; which is a continuation of U.S. patent application Ser. No. 11/351,720, filed Feb. 10, 2006, issued as U.S. Pat. No. 7,284,626 on Oct. 23, 2007; which is a continuation of U.S. patent application Ser. No. 10/998,329, filed Nov. 23, 2004, now U.S. Pat. No. 7,011, 172; which is a continuation of U.S. patent application Ser. No. 10/431,205, filed May 7, 2003, now U.S. Pat. No. 6,902, 019; which is a continuation of U.S. patent application Ser. No. 10/022,552, filed Dec. 17, 2001, now U.S. Pat. No. 6,588, 523; which is a continuation of U.S. patent application Ser. No. 09/434,948, filed Nov. 5, 1999, now U.S. Pat. No. 6,330, 926; which claimed the benefit of U.S. Provisional Patent Application No. 60/154,089, filed Sep. 15, 1999. All of the foregoing applications and issued patents are hereby expressly incorporated by reference herein.

BACKGROUND AND SUMMARY OF THE INVENTION

The present invention relates to a stretcher such as a wheeled stretcher for use in a hospital, and particularly to a wheeled stretcher having a wheel that can be deployed to contact a floor along which the stretcher is being pushed. More particularly, the present invention relates to a wheeled stretcher having a motorized wheel.

It is known to provide hospital stretchers with four casters, one at each corner, that rotate and swivel, as well as a center wheel that can be lowered to engage the floor. See, for example, U.S. patent application Ser. No. 09/150,890, filed on Sep. 10, 1998, entitled "STRETCHER CENTER WHEEL MECHANISM", for Heimbrock et al., which patent application is assigned to the assignee of the present invention and incorporated herein by reference. Other examples of wheeled stretchers are shown in U.S. Pat. Nos. 5,806,111 to Heimbrock et al. and 5,348,326 to Fullenkamp et al., both of which are assigned to the assignee of the present invention, and U.S. Pat. Nos. 5,083,625 to Bleicher; 4,164,355 to Eaton et al.; 3,304,116 to Stryker; and 2,599,717 to Menzies. The center wheel is typically free to rotate but is constrained from swiveling in order to facilitate turning the stretcher around corners. The center wheel may be yieldably biased downwardly against the floor to permit the center wheel to track differences in the elevation of the floor. The present invention comprises improvements to such wheeled stretchers.

According to the present invention, a stretcher for transporting a patient along a floor includes a frame, a plurality of casters coupled to the frame, a wheel supported relative to the frame and engaging the floor, and a drive assembly drivingly couplable to the wheel. The drive assembly has a first mode of operation decoupled from the wheel so that the wheel is free to rotate when the stretcher is manually pushed along the floor without hindrance from the drive assembly. The drive assembly has a second mode of operation coupled to the wheel to drive the wheel and propel the stretcher along the floor.

According to still another aspect of the present invention, a stretcher for transporting a patient along the floor includes a frame, a plurality of casters coupled to the frame, a wheel coupled to the frame and engaging the floor, a push handle coupled to the frame to maneuver the stretcher along the floor, a drive assembly selectively couplable to the wheel and being operable to drive the wheel and propel the stretcher along the floor, and a hand control coupled to a distal end of the push handle to operate the drive assembly.

In accordance with a further aspect, the drive assembly includes a motor having a rotatable output shaft, a belt coupled to the output shaft and the wheel, and a belt tensioner movable to tension the belt so that the belt transfers rotation from the output shaft to the wheel.

According to a still further aspect, the belt tensioner includes a bracket, an idler coupled to the bracket, and an actuator coupled to the idler bracket. Illustratively, the actuator has a first orientation in which the idler is spaced apart from or lightly contacting the belt, and a second orientation in which the idler engages the belt to tension the belt to transfer rotation from the drive motor to the wheel.

In accordance with another embodiment of the drive assembly, the wheel is mounted directly on an output shaft of a drive motor. In accordance with still another embodiment of the drive assembly, the wheel is mounted directly on a rim portion of a rotor of a drive motor.

In accordance with another aspect, the stretcher further includes a battery supported on the frame and an on/off switch coupled to the drive motor and the actuator. The on/off switch has an "on" position in which the drive motor and the actuator are supplied with electrical power, and an "off" position in which the drive motor and the idler bracket actuator are prevented from receiving electrical power.

In accordance with still another aspect, the second mode of operation of the drive assembly includes a forward mode in which the drive assembly is configured so that the wheel is driven in a forward direction, and a reverse mode in which the drive assembly is configured so that the wheel is driven in a reverse direction. Illustratively, movement of a control to a forward position configures the drive assembly in the forward mode, and to a reverse position configures the drive assembly in the reverse mode. In one embodiment, the control includes a rotatable switch coupled to a distal end of a push handle, and which is biased to a neutral position between the forward position and the reverse position. In another embodiment, the control includes a push-type switch coupled to a distal end of a push handle to control the speed of the drive motor, and a forward/reverse switch located on the stretcher to control the direction of rotation of the drive motor.

According to another aspect of the invention, a stretcher for transporting a patient along a floor includes a frame, a plurality of casters coupled to the frame, a first assembly coupled to the frame for rotatably supporting a wheel between a first position spaced apart from the floor and a second position engaging the floor, a selectively engagable clutch configured to selectively couple a drive motor to the wheel when the clutch is engaged. Illustratively, the clutch allows the wheel to rotate freely when the stretcher is manually pushed along the floor without hindrance from the drive motor when the wheel is engaging the floor and the clutch is disengaged. On the other hand, the drive motor drives the wheel to propel the stretcher along the floor when the wheel is engaging the floor and the clutch is engaged.

Additional features of the present invention will become apparent to those skilled in the art upon a consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 15 is an exploded perspective view of an alternative push-type switch assembly configured to be coupled to the distal end of the handle post of the first push bar for operating the drive assembly, the push-type switch assembly including a pressure sensitive switch configured to be positioned inside the handle post and a flexible dome-shaped cap configured to be coupled to an input shaft of the pressure sensitive switch, FIG. 15*a* is a view showing a forward/reverse switch configured to be coupled to a distal end of the handle post of the second push bar, FIG. 16 is a sectional view of the push-type switch assembly of FIG. 15 coupled to the distal end of the handle post of the first push bar, FIG. 17 is a sectional view similar to FIG. 16, showing the flexible dome-shaped cap of the push-type switch assembly pressed to push the input shaft of the pressure sensitive switch.

DETAILED DESCRIPTION OF THE DRAWINGS

The present invention will be described in conjunction with a hospital stretcher, but it will be understood that the same may be used in conjunction with any patient support apparatus, such as an ambulatory chair.

Figures 1, 1A:
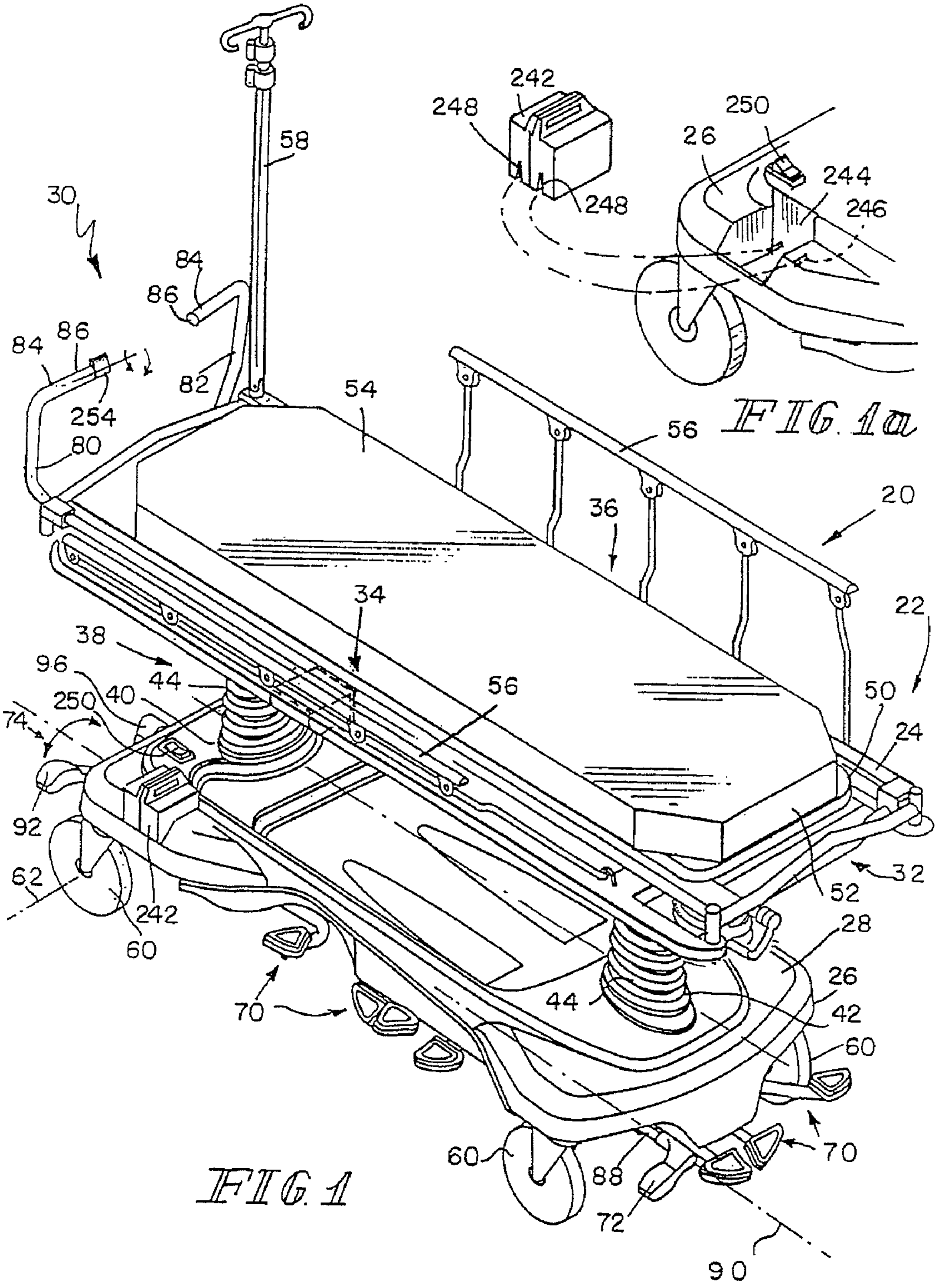
FIG. 1 is a perspective view showing a wheeled stretcher incorporating a drive assembly including a floor-engaging wheel for propelling the stretcher along a floor in accordance with the present invention.
FIG. 1*a* is a perspective view of a portion of the stretcher of FIG. 1, showing a rechargeable battery, a recessed battery compartment in a lower frame configured for receiving the battery and a main power switch mounted on the lower frame adjacent to the battery compartment.

Referring to FIG. 1, a stretcher 20 in accordance with the present invention includes a frame 22, comprising an upper frame 24 and a lower frame 26, a shroud 28 covering the lower frame 26, a head end 30, a foot end 32, an elongated first side 34, and an elongated second side 36. As used in this description, the phrase "head end 30" will be used to denote the end of any referred-to object that is positioned to lie nearest the head end 30 of the stretcher 20, and the phrase "foot end 32" will be used to denote the end of any referred-to object that is positioned to lie nearest the foot end 32 of the stretcher 20. Likewise, the phrase "first side 34" will be used to denote the side of any referred-to object that is positioned to lie nearest the first side 34 of the stretcher 20 and the phrase "second side 36" will be used to denote the side of any referred-to object that is positioned to lie nearest the second side 36 of the stretcher 20.

The upper frame 24 is movably supported above the lower frame 26 by a lifting mechanism 38 for raising, lowering, and tilting the upper frame 24 relative to the lower frame 26. Illustratively, the lifting mechanism 38 includes head end and foot end hydraulic cylinders 40 and 42, which are covered by flexible rubber boots 44. The head end hydraulic cylinder 40 controls the vertical position of the head end 30 of the upper frame 24 relative to the lower frame 26, and the foot end hydraulic cylinder 42 controls the vertical position of the foot end 32 of the upper frame 24 relative to the lower frame 26.

It is well known in the hospital equipment art to use various types of mechanical, electro-mechanical, hydraulic or pneumatic devices, such as electric drive motors, linear actuators, lead screws, mechanical linkages and cam and follower assemblies, to effect motion. It will be understood that the terms "drive assembly" and "linkage assembly" in the specification and in the claims are used for convenience only, and are intended to cover all types of mechanical, electro-mechanical, hydraulic and pneumatic mechanisms and combinations thereof, without limiting the scope of the invention.

A patient support deck 50 is carried by the upper frame 24 and has a head end 30, a foot end 32, a first elongated side 34, and a second elongated side 36. A mattress 52 having an upwardly-facing patient support surface 54 is supported by the patient support deck 50. A pair of collapsible side rails 56 are mounted to the upper frame 24 adjacent to the first and second elongated sides 34, 36 of the patient support deck 50. An IV pole 58 for holding solution containers or other objects at a position elevated above the patient support surface 54 is pivotably attached to the upper frame 24, and can be pivoted between a lowered horizontal position alongside the patient support deck 50 and a generally vertical raised position shown in FIG. 1.

Casters 60 are mounted to the lower frame 26, one at each corner, so that the stretcher 20 can be rolled over a floor 62 across which a patient is being transported. Several foot pedals 70 are pivotably coupled to the lower frame 26 and are coupled to the lifting mechanism 38 to control the vertical movement of the head end 30 and the foot end 32 of the upper frame 24 relative to the lower frame 26. In addition, a brake pedal 72 is coupled to the lower frame 26 near the foot end 32 thereof to control the braking of the casters 60. A brake-steer butterfly pedal 74 is coupled to the lower frame 26 near the head end 30 thereof to control both the braking of the casters 60, and the release of the braked casters 60. Each of the foot pedals 70, brake pedal 72, and brake-steer pedal 74 extends outwardly from the lower frame 26.

Figure 11:
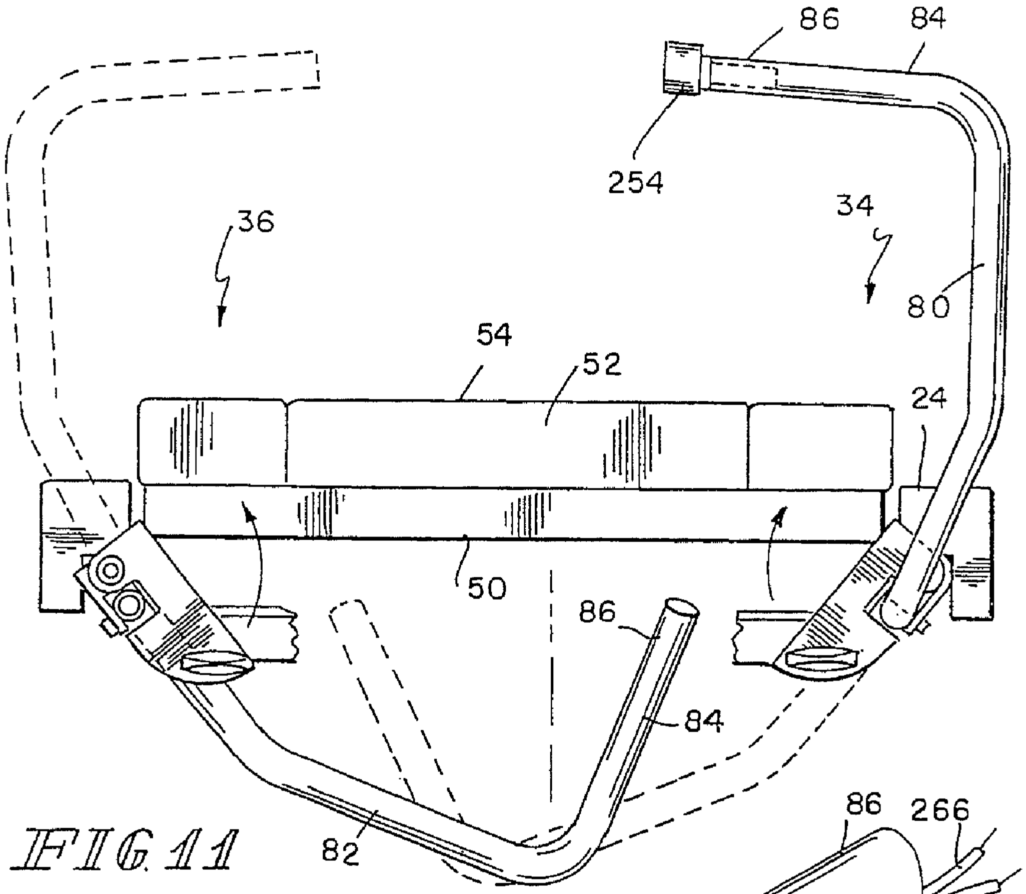
FIG. 11 is an end elevation view of the stretcher of FIG. 1, showing the head end of a patient support deck mounted on the lower frame, a first push bar locked in an upward push position and having a handle post extending generally horizontally above the patient support deck, a second push bar locked in a down-out-of-the-way position having a handle post below the patient support deck, and a rotary switch coupled to a distal end of the handle post of the first push bar for operating the drive assembly.

As shown in FIG. 11, a first push bar 80 is pivotally mounted to the head end 30 of the upper frame 24 below the patient support deck 50 adjacent to the first elongated side 34 of the patient support deck 50. Likewise, a second push bar 82 is pivotally mounted to the head end 30 of the upper frame 24 below the patient support deck 50 adjacent to the second elongated side 36 of the patient support deck 50. Each of the first and second push bars 80, 82 is independently movable between a raised push position shown in FIGS. 1 and 11, and a lowered down-out-of-the-way position shown in FIG. 11. The first and second push bars 80, 82 each include a handle post 84 that is grasped by the caregiver when the first and second push bars 80, 82 are in the raised push position to manually push the stretcher 20 over the floor 62. When the push bars 80, 82 are in the down-out-of-the-way position, the push bars 80, 82 are below and out of the way of the patient support surface 54, thus maximizing the caregiver's access to a patient on the patient support surface 54.

As previously described, the stretcher 20 includes the brake pedal 72 positioned at the foot end 32 of the stretcher 20, and the brake-steer pedal 74 positioned at the head end 30 of the stretcher 20. A brake-steer shaft 88 extends longitudinally along the length of the stretcher 20 on the first side 34 thereof underneath the shroud 28, and is connected to both the brake pedal 72 at the foot end 32 and the brake-steer pedal 74 at the head end 30. Movement of either the brake pedal 72 or the brake-steer pedal 74 by a caregiver causes the brake-steer shaft 88 to rotate about a longitudinal pivot axis 90. When the brake-steer shaft 88 is in a neutral position shown in solid lines in FIG. 4, the brake-steer pedal 74 is generally horizontal as shown in FIG. 1, and the casters 60 are free to swivel and rotate. From the generally horizontal neutral position, the caregiver can depress the brake pedal 72 or a braking portion 92 of the brake-steer pedal 74 to rotate the brake-steer shaft 88 in an anticlockwise, braking direction indicated by arrow 94 in FIG. 4 to a brake position shown in phantom in FIG. 4. In the braking position, the braking portion 92 of the brake-steer pedal 74 is angled downwardly toward the first side 34 of the stretcher 20, and a steering portion 96 of the brake-steer pedal 74 is angled upwardly. Rotation of the brake-steer shaft 88 to the brake position moves brake shoes into engagement with the casters 60 to stop rotation and swiveling movement of the casters 60.

Figure 4:
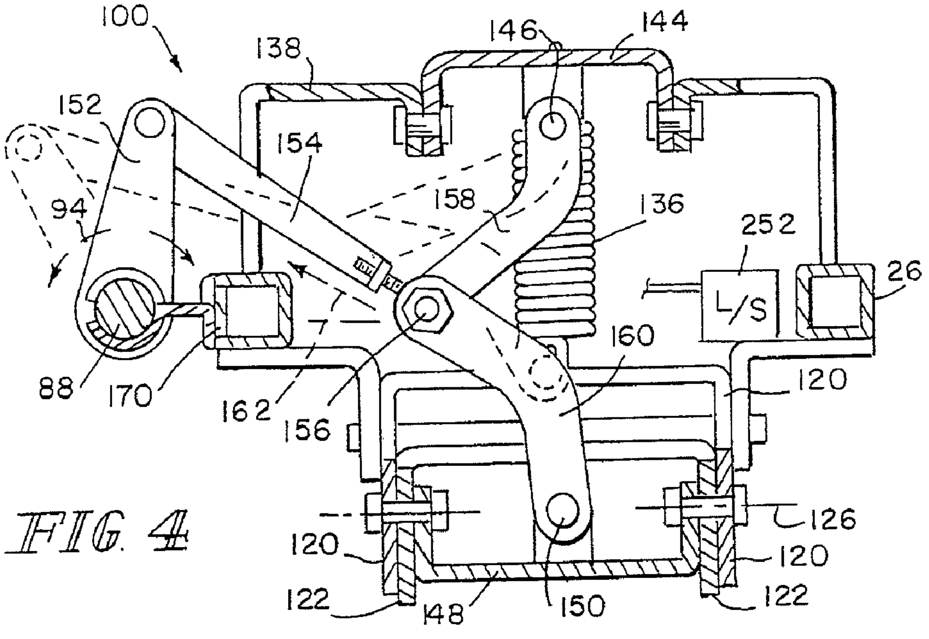
FIG. 4 is a sectional view taken along line 4-4 in FIG. 3, and showing the linkage assembly in the neutral position in which the wheel spaced apart from the floor.

From the brake position shown in phantom in FIG. 4, the caregiver can depress a steering portion 96 of the brake-steer pedal 74 to rotate the brake-steer shaft 88 in a clockwise direction back to the neutral position shown in solid lines in FIG. 4. When the brake-steer shaft 88 is in the neutral position, the caregiver can depress the steering portion 96 of the brake-steer pedal 74 to rotate the brake-steer shaft 88 in a clockwise, steering direction indicated by arrow 98 shown in FIG. 6 to a steer position shown in FIG. 6. In the steer position, the braking portion 92 of the brake-steer pedal 74 is angled upwardly, and the steering portion 96 of the brake-steer pedal 74 is angled downwardly toward the second side 36 of the stretcher 20.

A linkage assembly 100 is provided for lifting and lowering a wheel 110. The linkage assembly 100 has (i) a neutral position (shown in FIGS. 3 and 7) in which the wheel 110 is raised above the floor 62 a first distance, (ii) a brake position (shown in phantom in FIG. 4) in which the wheel 110 is raised above the floor 62 a second higher distance, and (iii) steer position (shown in FIGS. 5 and 8-10) in which the wheel 110 is engaging the floor 62. The floor-engaging wheel 110 serves a dual purpose—(a) it facilitates steering of the stretcher 20, and (b) it drives the stretcher 20 along the floor 62 in a power drive mode. Referring to FIGS. 2-6, the wheel 110 is mounted on an axle 112 coupled to the lower frame 26 by a wheel-mounting bracket 114. The wheel-mounting bracket 114 is, in turn, coupled to the brake-steer shaft 88. Rotation of the brake-steer shaft 88 changes the position of the wheel 110 relative to the floor 62. For example, when the brake-steer pedal 74 and the brake-steer shaft 88 are in the neutral position, the wheel-mounting bracket 114 holds the wheel 110 above the floor 62 a first distance (approximately 0.5 inches (1.3 cm)) as shown in FIG. 3.

When the brake-steer shaft 88 rotates in the braking direction 94 (shown in FIG. 4), the linkage assembly 100 pivots the wheel-mounting bracket 114 upwardly to further lift the wheel 110 above the floor 62 a second higher distance (approximately 3.5 inches (8.9 cm)) to allow equipment, such as the base of an overbed table (not shown), to be positioned underneath the wheel 110. When the brake-steer shaft 88 rotates in the steering direction 98 (shown in FIG. 6), the linkage assembly 100 pivots the wheel-mounting bracket 114 downwardly to lower the wheel 110 to engage the floor 62 as shown in FIGS. 5 and 8-10.

The wheel-mounting bracket 114 includes a first outer fork 120, and a second inner fork 122. A foot end 32 of the first fork 120, that is the end of the first fork 120 closer to the foot end 32 of the stretcher 20, is pivotably coupled to the lower frame 26 for pivoting movement about a first transverse pivot axis 124. A head end of the first fork 120, that is the end of the first fork 120 closer to the head end 30 of the stretcher 20, is pivotably coupled to the second fork 122 for rotation about a second transverse pivot axis 126. A head end portion 130 of the second fork 122 extends from the second transverse pivot axis 126 toward the head end 30 of the stretcher 20. The wheel 110 is coupled to the head end portion 130 of the second fork 122 for rotation about an axis of rotation 128. A foot end portion 132 of the second fork 122 extends from the second transverse pivot axis 126 toward the foot end 32 of the stretcher 20, and is received by a space formed by two spaced-apart prongs of the first fork 120.

An end plate 134 is fixed to the foot end portion 132 of the second fork 122. A vertically oriented spring 136 connects the end plate 134 to a frame bracket 138 mounted to the lower frame 26. When the wheel 110 is in the neutral position (raised approximately 0.5 inches (1.3 cm)), the brake position (raised approximately 3.5 inches (8.9 cm)), and the steer position (engaging the floor 62), the spring 136 yieldably biases the end plate 134 and the foot end portion 132 of the second fork 122 upwardly, so that the head end portion 130 of the second fork 122 and the wheel 110 are yieldably biased downwardly. The end plate 134 has a pair of transversely extending barbs 140 shown in FIGS. 3 and 5 that are appended to a lower end of the end plate 134 and that are positioned to engage the bottom of the first fork 120 when the first and second forks 120, 122 are in an "in-line" configuration defining a straight bracket as shown in FIG. 3. Thus, the barbs 140 stop the upward movement of the end plate 134 at the in-line configuration to limit the downward movement of the head end portion 130 of the second fork 122 and the wheel 110 relative to the first fork 120 as the spring 136 biases the end plate 134 of the second fork 122 upwardly.

Figure 5:
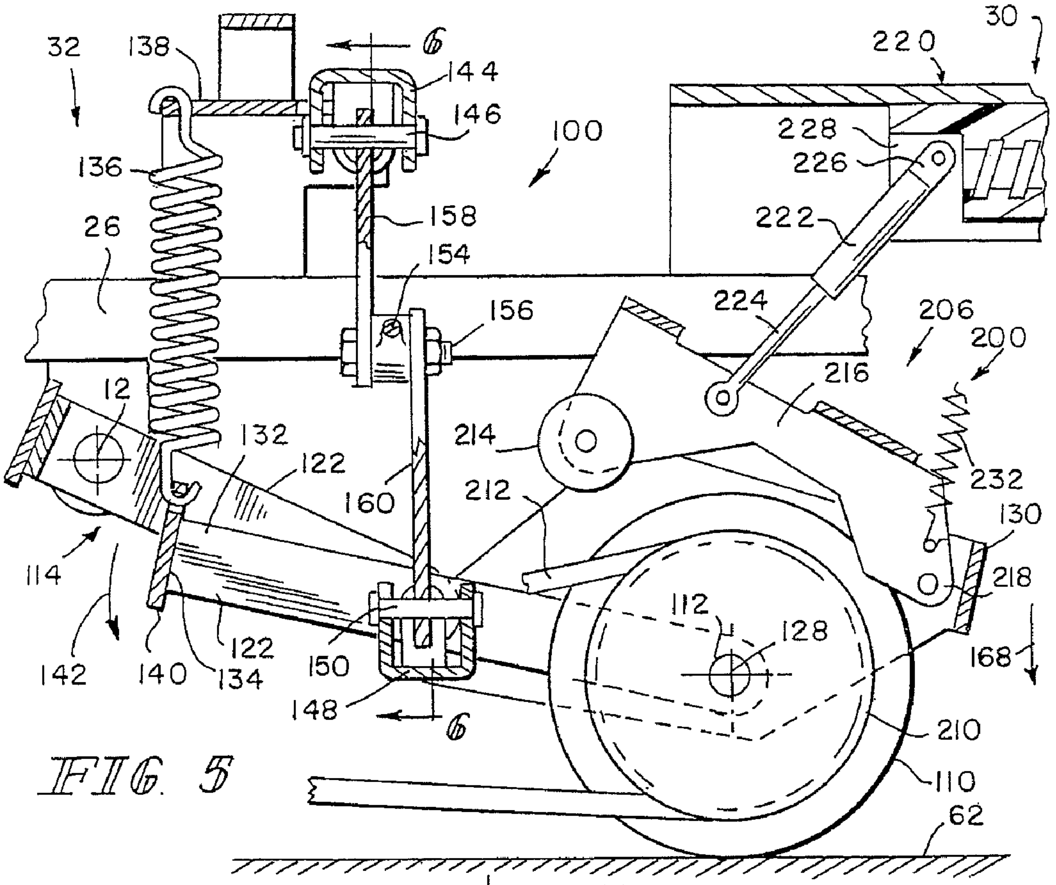
FIG. 5 is a view similar to FIG. 3, showing the linkage assembly in the steer position with the wheel engaging the floor, and further showing the actuator in the first orientation with the idler spaced apart from the belt to decouple the drive motor from the wheel so that the wheel is free to rotate when the stretcher is manually pushed along the floor without hindrance from the drive assembly.

When the brake-steer shaft 88 pivots the wheel-mounting bracket 114 downwardly to the steer position shown in FIGS. 5 and 8-10, the wheel 110 is lowered to a position engaging the floor 62. Continued downward movement of the wheel-mounting bracket 114 pivots the second fork 122 relative to the first fork 120 about the second transverse pivot axis 126 in the direction indicated by arrow 142 shown in FIG. 5, moving the first and second forks 120, 122 into an "angled" configuration as shown in FIG. 5. The end plate 134 is yieldably biased upwardly by the spring 136 to yieldably bias the wheel 110 downwardly against the floor 62. Preferably, the downward force urging the wheel 110 against the floor 62 should be sufficient to prevent the wheel 110 from sliding sideways when the stretcher 20 is turned. A spring force of approximately 40 pounds (about 18 kilograms) has been found to be adequate.

As can be seen, the spring 136 biases the second fork 122 away from the angled configuration and toward the in-line configuration, so that the wheel 110 is biased to a position past the plane defined by the bottoms of the casters 60 when the wheel 110 is lowered for engaging the floor 62. Of course, the floor 62 limits the downward movement of deployed wheel 110. However, if the floor 62 has a surface that is not planar or that is not coincident with the plane defined by the casters 60, the spring 136 cooperates with the first and second forks 120, 122 to maintain contact between the wheel 110 and the floor 62. Illustratively, the spring 136 can maintain engagement between the deployed wheel 110 and the floor 62 when the floor 62 beneath the wheel 110 is spaced approximately 1 inch (2.5 cm) below the plane defined by the casters 60. Also, the spring 136 allows the deployed wheel 110 to pass over a threshold that is approximately 1 inch (2.5 cm) above the plane defined by the casters 60 without causing the wheel 110 to move out of the steer position into the neutral position.

The linkage assembly 100 includes an upper bent-cross bracket 144 coupled to the frame bracket 138, and supporting an upper pivot pin 146. Likewise, the linkage assembly 100 includes a lower bent-cross bracket 148 coupled to the wheel-mounting bracket 114, and supporting a lower pivot pin 150. In addition, the linkage assembly 100 includes (i) a pivot link 152 fixed to the brake-steer shaft 88, (ii) a connecting link 154 extending from the pivot link 152 to a common pivot pin 156, (iii) a frame link 158 extending from the common pivot pin 156 to the upper pivot pin 146 of the upper bent-cross bracket 144, and (iv) a bracket link 160 extending from the common pivot pin 156 to the lower pivot pin 150 of the lower bent-cross bracket 148.

Figure 2:
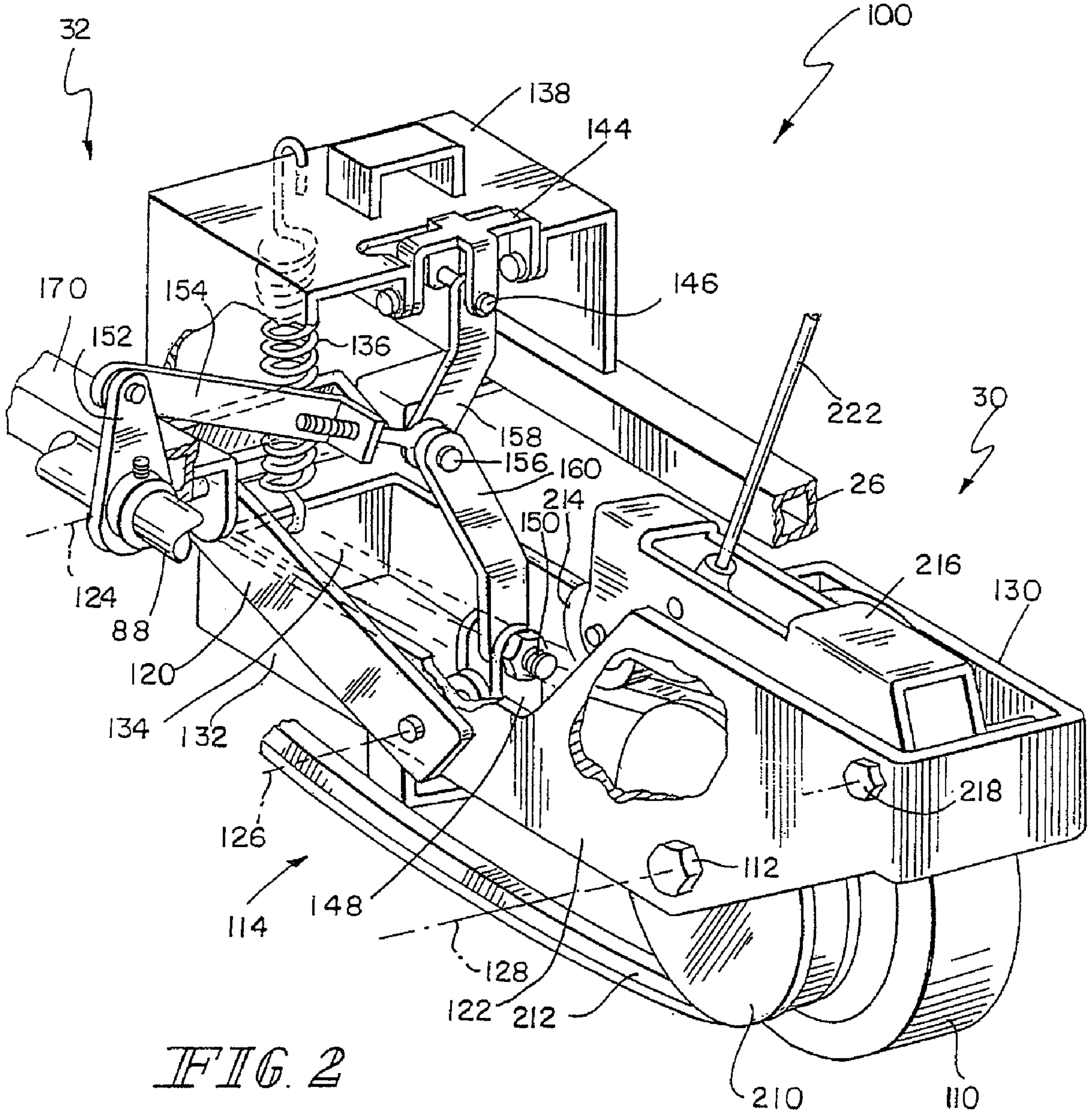
FIG. 2 is a partial perspective view, with portions broken away, showing a linkage assembly for lifting and lowering the wheel, and a drive assembly drivingly couplable to the wheel for propelling the stretcher along the floor, the linkage assembly having a neutral position (shown in FIGS. 3 and 7) in which the wheel is spaced apart from the floor and a steer position (shown in FIGS. 5 and 8) in which the wheel is engaging the floor, and the drive assembly having a first mode of operation (shown in FIGS. 5 and 8) decoupled from the wheel so that the wheel is free to rotate when the stretcher is manually pushed along the floor without hindrance from the drive assembly and a second mode of operation (shown in FIGS. 9 and 10) coupled to the wheel to drive the wheel to propel the stretcher along the floor.
Figure 3:
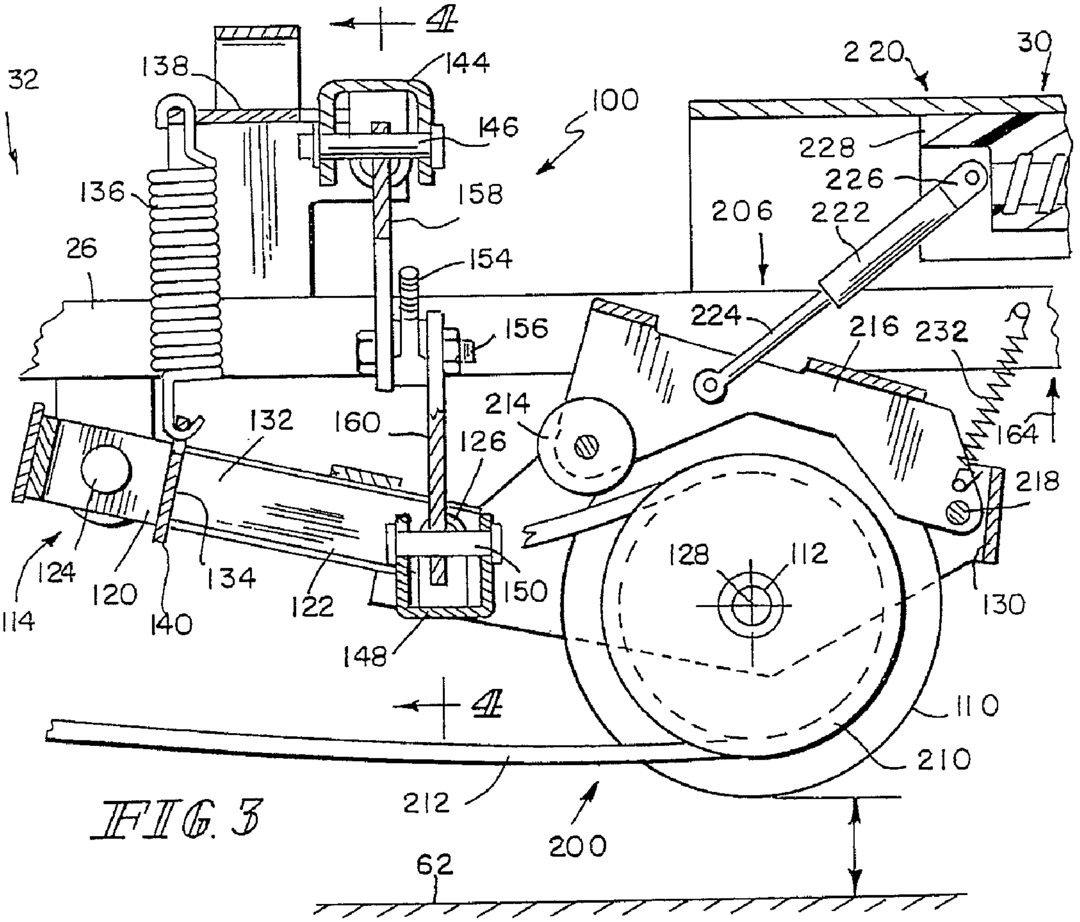
FIG. 3 is a side elevation view showing the linkage and drive assemblies of FIG. 2, the linkage assembly being shown in the neutral position with the wheel spaced apart from the floor, and further showing the drive assembly in the first mode of operation decoupled from the wheel, the drive assembly including a belt coupling a drive motor to the wheel and a belt tensioner to selectively tension the belt, the belt tensioner including a support bracket, an idler pulley (hereinafter idler) coupled to the support bracket, and an actuator having a first orientation (shown in FIGS. 3, 5, 7 and 8) in which the idler is spaced apart from the belt to decouple the drive motor from the wheel, and a second orientation (shown in FIGS. 9 and 10) in which the idler engages the belt to tension the belt to couple the drive motor to the wheel to propel the stretcher along the floor when the wheel is engaging the floor.
Figure 6:
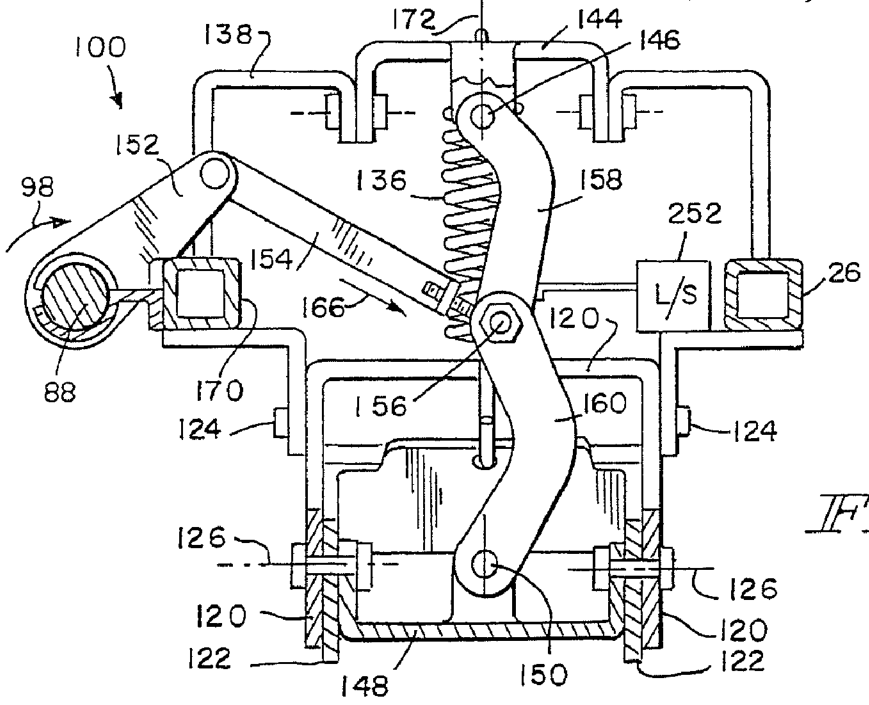
FIG. 6 is a sectional view similar to FIG. 4 taken along line 6-6 in FIG. 5, and showing the linkage assembly in the steer position in which the wheel engaging the floor.

The frame link 158 and the bracket link 160 form a scissors-like arrangement as shown in FIGS. 2, 4 and 6. When the caregiver depresses brake pedal 72 (or the braking portion 92 of the brake-steer pedal 74) and rotates the brake-steer shaft 88 in the counter-clockwise direction 94 toward the brake position, the pivot link 152 pivots away from the wheel-mounting bracket 114, pulling the connecting link 154 and the common pivot pin 156 toward the brake-steer shaft 88 in the direction indicated by arrow 162 shown in FIG. 4. The upper bent-cross bracket 144 is vertically fixed relative to the lower frame 26 and the lower bent-cross bracket 148 is fixed to the wheel-mounting bracket 114, which is pivotably mounted to the lower frame 26 for upward and downward pivoting movement relative to the lower frame 26. Movement of the common pivot pin 156 in the direction 162 closes the scissors arrangement formed by the frame link 158 and the bracket link 160 as shown in phantom in FIG. 4, pulling the bracket link 160 upwardly. Pulling the bracket link 160 upwardly pivots the wheel-mounting bracket 114 in the direction of arrow 164 shown in FIG. 3, and further lifts the wheel 110 off of the floor 62.

When the caregiver depresses the steering portion 96 of the brake-steer pedal 74 and rotates the brake-steer shaft 88 in the clockwise direction 98 (shown in FIG. 6) toward the steer position, the pivot link 152 pivots toward the wheel-mounting bracket 114 pushing the connecting link 154 and the common pivot pin 156 away from the brake-steer shaft 88 in the direction of arrow 166 shown in FIG. 6. Movement of the common pivot pin 156 in the direction indicated by arrow 166 opens the scissors arrangement formed by the frame link 158 and the bracket link 160, and pushes the bracket link 160 downwardly. Pushing the bracket link 160 downwardly pivots the wheel-mounting bracket 114 in the direction of arrow 168 shown in FIG. 5, thus deploying the wheel 110 into engagement with the floor 62.

When the brake-steer shaft 88 is in the steer position, the pivot link 152 contacts a frame member 170 coupled to the lower frame 26, stopping the brake-steer shaft 88 from further rotation in the clockwise direction as shown in FIG. 6. When the pivot link 152 contacts the frame member 170, the common pivot pin 156 is in an "over-the-center position" away from the brake-steer shaft 88 and beyond a vertical plane 172 (shown in FIG. 6) defined by the upper and lower pivot pins 146 and 150, so that the scissors arrangement formed by the frame link 158 and bracket link 160 is in a generally fully-opened position. The upward tension of spring 136 in conjunction with the over-the-center position of the common pivot pin 156 biases the pivot link 152 against the frame member 170 and biases the common pivot pin 156 away from the brake-steer shaft 88, to lock the wheel 110 and the brake-steer shaft 88 in the steer position shown in FIGS. 5 and 8-10.

Thus, the stretcher 20 includes the brake pedal 72 and the brake-steer pedal 74 connected to the longitudinally extending brake-steer shaft 88. Actuation of the brake pedal 72 or the brake-steer pedal 74 by the caregiver simultaneously controls the position of wheel 110 and the braking of casters 60. The brake-steer pedal 74 has a horizontal neutral position where the wheel 110 is at the first distance above the floor 62 and the casters 60 are free to rotate and swivel.

From the neutral position, the caregiver can push the brake pedal 72 or the braking portion 92 of the brake-steer pedal 74 down to rotate the brake-steer shaft 88 by about 30 degrees to the brake position to brake the casters 60. In addition, when the brake-steer shaft 88 rotates to the brake position, the pivot link 152 pivots away from the wheel-mounting bracket 114 pulling the connecting link 154 and the common pivot pin 156 in the direction 162 (shown in FIG. 4) and closing the scissors arrangement of the frame link 158 and the bracket link 160 to lift the wheel 110 to the second higher distance above the floor 62.

The caregiver can also push the steering portion 96 of the brake-steer pedal 74 down to rotate the brake-steer shaft 88 by about 30 degrees past the neutral position to the steer position in which the casters 60 are free to rotate and swivel. In addition, when the brake-steer shaft 88 rotates to the steer position, the pivot link 152 pivots toward the wheel-mounting bracket 114 pushing the connecting link 154 and the common pivot pin 156 in the direction 166 (shown in FIG. 6) and opening the scissors arrangement formed by the frame link 158 and the bracket link 160 to deploy the wheel 110 to engage floor 62 with enough pressure to facilitate steering of the stretcher 20. In the steer position, the second fork 122 of the wheel-mounting bracket 114 pivots relative to the first fork 120 and relative to the lower frame 26. The wheel 110 is spring-biased into engagement with the floor 62 with sufficient force to permit the wheel 110 to track differences in elevation of the floor 62. Reference may be made to the above-mentioned U.S. patent application Ser. No. 09/150,890, entitled "STRETCHER CENTER WHEEL MECHANISM", for further description of the linkage assembly 100 for lifting and lowering the wheel 110.

Figure 7:
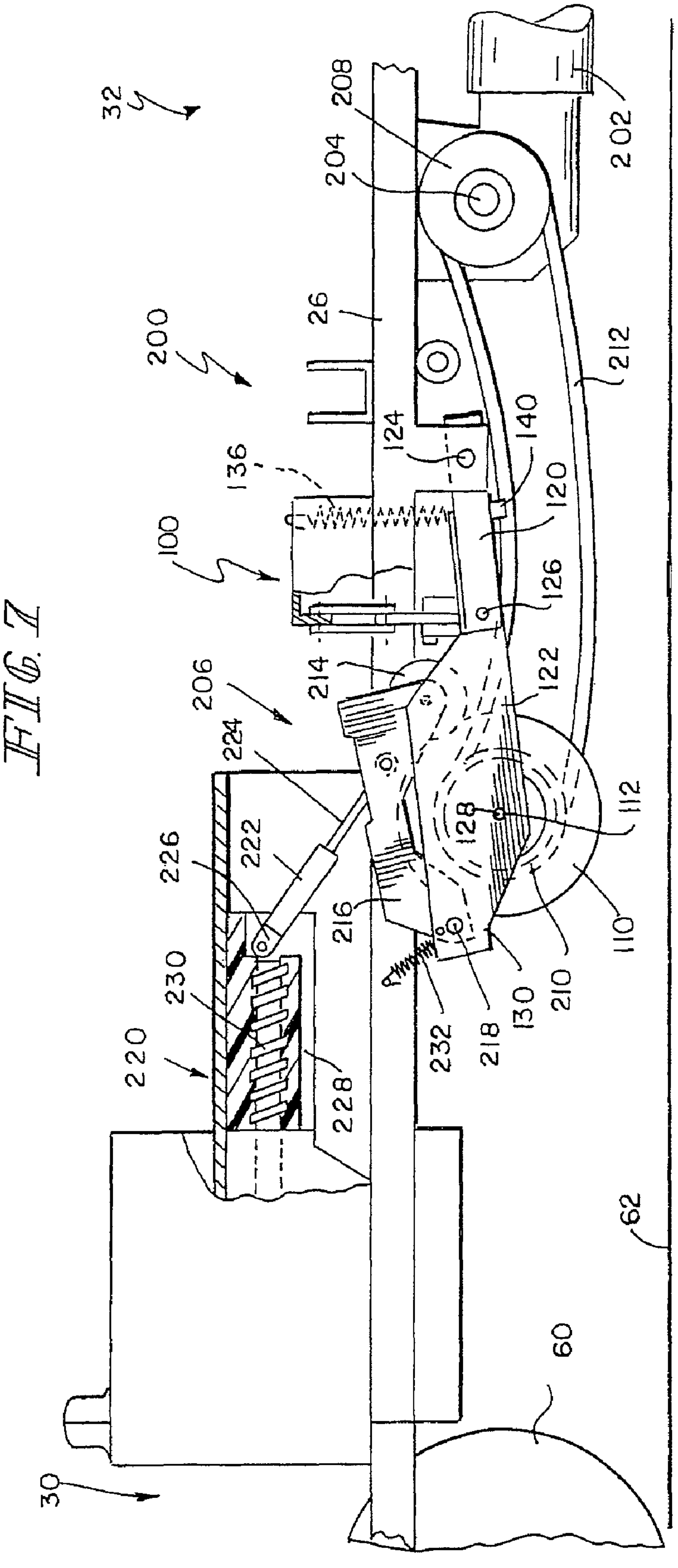
FIG. 7 is a side elevation view corresponding to FIG. 3, showing the linkage assembly in the neutral position with the wheel spaced apart from the floor, and the actuator in the first orientation with the idler spaced apart from the belt to decouple the drive motor from the wheel, and further showing the drive motor mounted on the lower frame, a wheel-mounting bracket supporting the wheel, the belt loosely coupled to the drive motor and the wheel, the idler support bracket carrying the idler pivotally coupled to the wheel-mounting bracket, and the actuator coupled to the idler support bracket.
Figure 8:
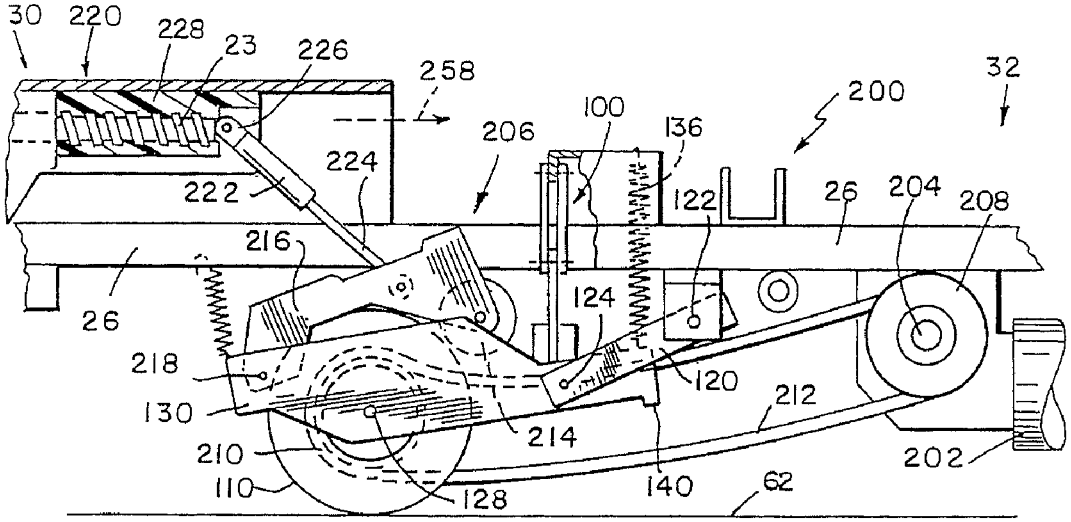
FIG. 8 is a side elevation view corresponding to FIG. 5, showing the linkage assembly in the steer position with the wheel engaging the floor, and the actuator in the first orientation with the idler spaced apart from the belt to decouple the drive motor from the wheel so that the wheel is free to rotate when the stretcher is manually pushed along the floor without hindrance from the drive motor.
Figure 9:
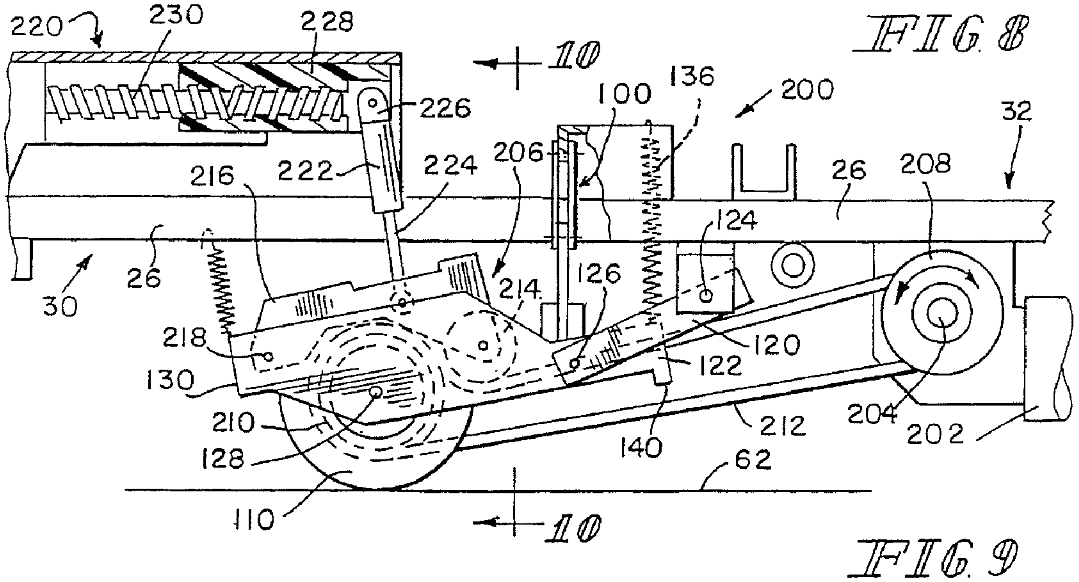
FIG. 9 is a view similar to FIG. 8, showing the linkage assembly in the steer position with the wheel engaging the floor, and the actuator in the second orientation with the idler engaging the belt to tension the belt to propel the stretcher along the floor.
Figure 10:
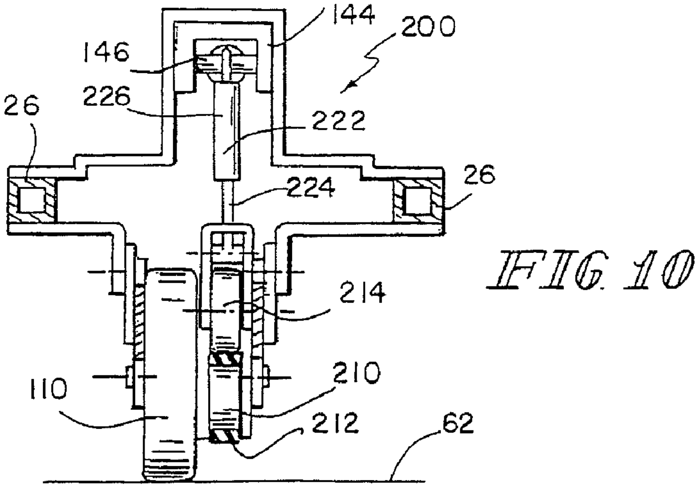
FIG. 10 is a sectional end view taken along line 10-10 in FIG. 9, showing the linkage assembly in the steer position with the wheel engaging the floor and the actuator in the second orientation to couple the drive motor to the wheel to propel the stretcher along the floor.

The construction and operation of a first embodiment of a drive assembly 200 of the present invention will now be described with reference to FIGS. 7-10. The drive assembly 200 includes a variable speed, bidirectional drive motor 202 having a rotatable output shaft 204, and a selectively engagable clutch 206 to selectively couple the drive motor 202 to the wheel 110 when the clutch 206 is engaged. As previously described, the wheel 110 has three positions—(i) a neutral position in which the wheel 110 is raised the first distance above the floor 62 as shown in FIGS. 3 and 7, (ii) a brake position in which the wheel 110 is raised the second higher distance above the floor 62, and (iii) a steer position in which the wheel 110 is engaging the floor 62 as shown in FIGS. 5 and 8-10. When the wheel 110 is engaging the floor 62, the drive assembly 200 has (a) a first, manual drive mode of operation decoupled from the wheel 110 (when the clutch is disengaged as shown in FIGS. 5 and 8) so that the wheel 110 is free to rotate when the stretcher 20 is manually pushed along the floor 62 without hindrance from the drive motor 202, and (b) a second, power drive mode of operation coupled to the wheel 110 (when the clutch is engaged as shown in FIGS. 9 and 10) to drive the wheel 110 to propel the stretcher 20 along the floor 62.

The selectively engagable clutch 206 includes a drive pulley 208 mounted on the rotatable output shaft 204 of the drive motor 202, a driven pulley 210 coaxially mounted on the axle 112 and coupled to the wheel 110, a slipbelt 212 (also referred to herein as belt 212) extending loosely between and around the drive pulley 208 and the driven pulley 210, an idler 214 having a first position (shown in FIGS. 5 and 8) spaced apart from or lightly contacting the belt 212 and a second position (shown in FIGS. 9 and 10) pressed against the belt 212 to put tension in the belt 212, a support bracket 216 pivotally mounted to the head end portion 130 of the wheel-mounting bracket 114 about a pivot pin 218, an actuator 220 mounted to the lower frame 26, and a gas spring 222 having its ends 224 and 226 pivotally coupled to the support bracket 216 and an output member 228 threadably engaging a rotatable output shaft 230 of the actuator 220. The support bracket 216, the actuator 220 and the gas spring 222 are sometimes referred to herein as a second assembly or second linkage assembly.

In the specification and claims, the language "idler 214 is spaced apart from the slipbelt 212" or "idler 214 is lightly contacting the slipbelt 212" is used for convenience only to connote that the slipbelt 212 is not in tension and the drive motor 202 is decoupled from the wheel 110 as shown in FIGS. 5 and 8. Thus, the language "idler 214 is spaced apart from the slipbelt 212" or "idler 214 is lightly contacting the slipbelt 212" is to be construed to mean that the drive motor 202 is decoupled from the wheel 110, and not to be construed to limit the scope of the invention.

In the manual drive mode, when the wheel 110 is engaging the floor 62 and the clutch 206 is disengaged as shown in FIGS. 5 and 8, the support bracket 216 has a first orientation in which the idler 214 is spaced apart from or lightly contacting the belt 212 so that the wheel 110 is free to rotate when the stretcher 20 is manually pushed along the floor 62 without hindrance from the drive motor 202. In the power drive mode, when the wheel 110 is engaging the floor 62 and the clutch 206 is engaged as shown in FIGS. 9 and 10, the support bracket 216 has a second orientation in which the idler 214 is pressed against the belt 212 to transfer rotation from the drive motor 202 to the wheel 110 to propel the stretcher 20 along the floor 62.

A power source, such as a rechargeable battery 242, is inserted into a recessed battery compartment 244 formed in the lower frame 26 as shown in FIG. 1*a* for supplying power to the drive motor 202 and the actuator 220. The battery compartment 244 has terminals 246 for engagement with corresponding terminals 248 on the rechargeable battery 242 when the battery 242 is inserted in the battery compartment 244. A main, on/off power switch 250 is mounted on the lower frame 26 away from the patient support deck 50 for connecting and disconnecting the drive motor 202 and the actuator 220 to and from the battery 242. A limit switch 252 is mounted on the lower frame 26 next to the linkage assembly 100, as shown in FIGS. 4 and 6, for sensing when the wheel 110 is lowered for engaging the floor 62. A rotary switch assembly 254 is coupled to a distal end 86 of the handle post 84 of the first push bar 80 as shown in FIGS. 1 and 11 for controlling the speed and direction of the variable speed, bidirectional drive motor 202.

The stretcher 20 is in the manual drive mode when the wheel 110 is engaging the floor 62, but the main power switch 250 on the lower frame 26 is switched off as shown in FIGS. 5 and 8. In the manual drive mode, the actuator 220 remains inactivated allowing the belt 212 to ride loosely over the drive and driven pulleys 208 and 210 to permit the wheel 110 to rotate freely when the stretcher 20 is manually pushed along the floor 62 without interference from the drive assembly 200.

The stretcher 20 is in the power drive mode when the wheel 110 is engaging the floor 62, and the main power switch 250 on the lower frame 26 is turned on as shown in FIGS. 9 and 10. In the power drive mode, the actuator 220 is activated to press the idler 214 against the belt 212 to couple the drive motor 202 to the wheel 110 to propel the stretcher 20 along the floor 62 in response to the operation of the rotary switch assembly 254 on the handle post 84.

A generally vertically oriented spring 232 (FIGS. 3, 5 and 7) coupled between a head end 30 of the idler support bracket 216 and the lower frame 26 helps to fully lift the linkage assembly 100 off the floor 62 when in neutral or brake positions. Alternatively, the vertically oriented spring 232 may be coupled between a head end 30 of the wheel-mounting bracket 114 and the lower frame 26. Guide rollers (not shown) are provided to prevent the belt 212 from slipping off the drive and driven pulleys 208 and 210.

When the actuator 220 is activated to press the idler 214 against the belt 212, the gas spring 222 is compressed as shown in FIGS. 9 and 10 to provide additional downward biasing force between the wheel 110 and the floor 62. Illustratively, the additional downward biasing force exerted by the compressed gas spring 222 is between seventy five pounds and one hundred pounds.

Figure 14:
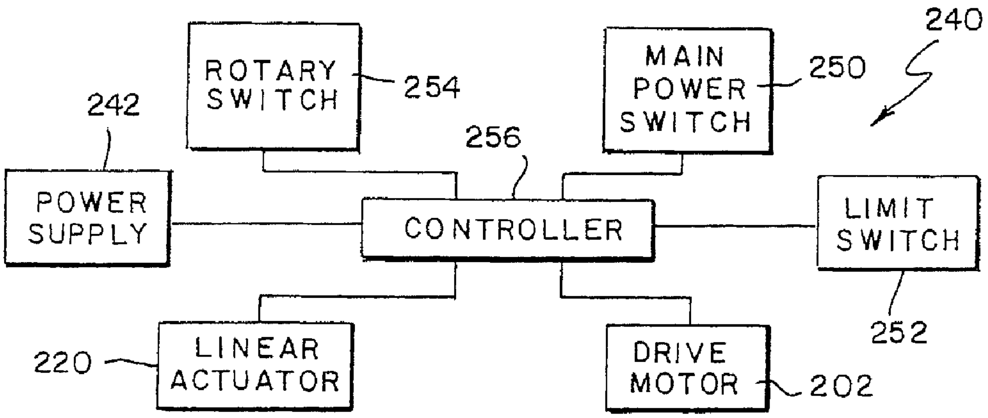
FIG. 14 is a block diagram, schematically showing the electrical components of the drive assembly.

FIG. 14 schematically shows the electrical system 240 for the drive assembly 200. The limit switch 252 senses when the wheel 110 is lowered for engaging the floor 62, and provides an input signal to a controller 256. The controller 256 activates the actuator 220 when the main power switch 250 is turned on and the limit switch 252 senses that the wheel 110 is engaging the floor 62. When the actuator 220 is turned on, the output member 228 of the actuator 220 is translated in the direction of arrow 258 (shown in FIG. 8) to cause the support bracket 216 to pivot clockwise about the pivot pin 218 to press the idler 214 against the belt 212 as shown in FIG. 9 to transfer rotation from the drive motor 202 to the wheel 110. The drive motor 202 then propels the stretcher 20 along the floor 62 in response to the operation of the rotary switch assembly 254. The rotary switch assembly 254 is rotated to a forward position for forward motion of the stretcher 20 and is rotated to a reverse position for reverse motion of the stretcher 20. The speed of the variable speed drive motor 202 is determined by the extent of rotation of the rotary switch assembly 254.

Figure 12:
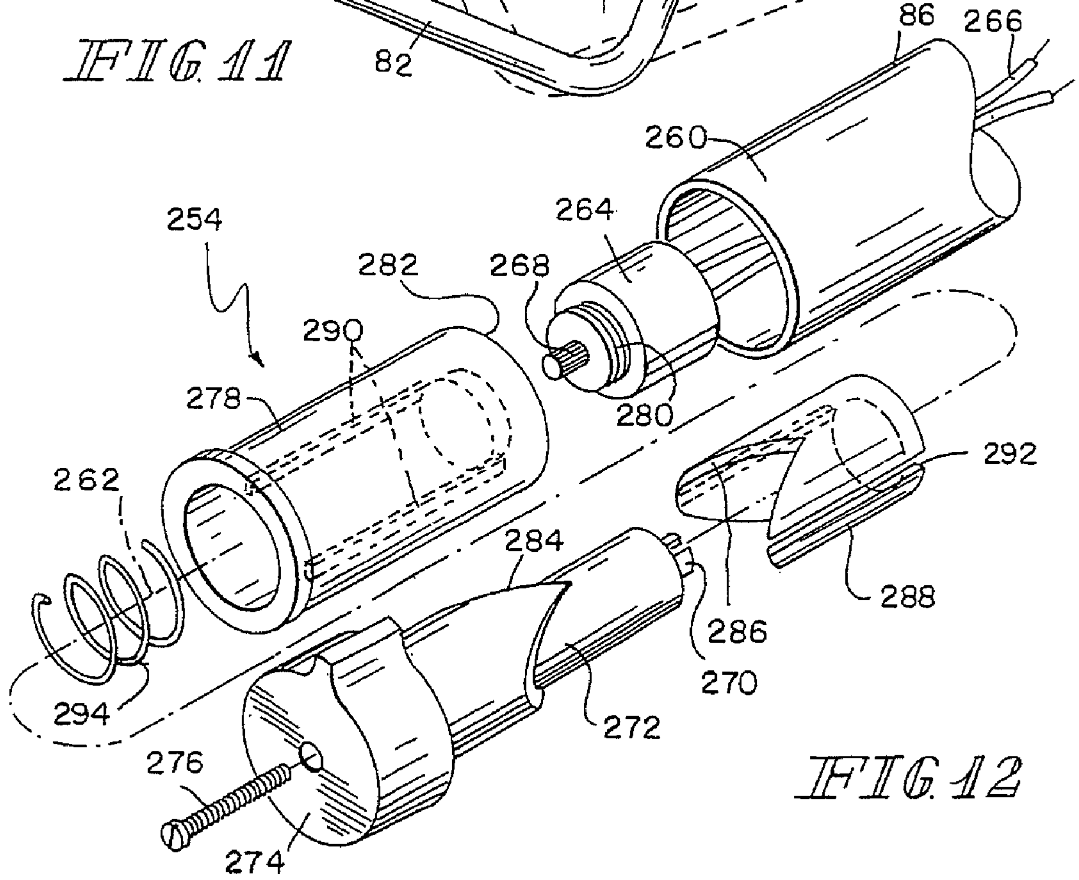
FIG. 12 is an exploded perspective view of the rotary switch of FIG. 11 coupled to the distal end of the handle post of the first push bar.
Figure 13:
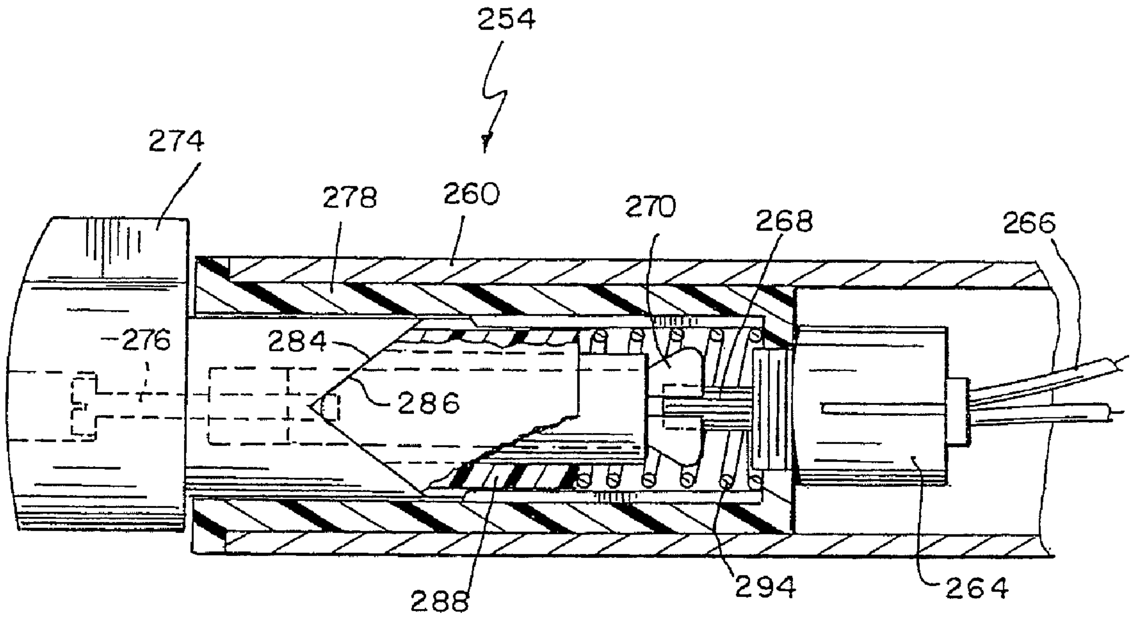
FIG. 13 is a sectional view of the rotary switch of FIGS. 11 and 12.

The rotary switch assembly 254 coupled to the distal end 86 of the handle post 84 will now be described with reference to FIGS. 12 and 13. FIG. 12 is an exploded perspective view of the rotary switch assembly 254, and FIG. 13 is a sectional view of the rotary switch assembly 254. The distal end 86 of the handle post 84 includes a generally cylindrical hollow tube 260 defining an axis 262. The rotary switch assembly

254 includes a bidirectional rotary switch 264 positioned inside the hollow tube 260 to rotate about the axis 262. Control wires 266 of the rotary switch 264 are routed through the hollow tube 260 for connection to the controller 256. The rotary switch 264 includes an input shaft 268 which is configured to be inserted into a chuck 270 coupled to an inner end of a control shaft 272. A thumb wheel 274 is coupled to an outer end of the chuck 270 by a set screw 276. The control shaft 272 is inserted into an outer sleeve 278 through an outer end thereof. The rotary switch 264 includes a threaded portion 280 that is screwed into a flange portion 282 formed at an inner end of the outer sleeve 278. The outer sleeve 278 is configured to be press fitted into the hollow tube 260 formed at the distal end 86 of the handle post 84 as shown in FIG. 13.

The rotary switch assembly 254 is biased toward a neutral position between the forward and reverse positions thereof. To this end, the control shaft 272 is formed to include wedge-shaped camming surfaces 284 which are configured to cooperate with corresponding, notch-shaped camming surfaces 286 formed in an inner sleeve 288 slidably received in the outer sleeve 278. The inside surface of the outer sleeve 278 is formed to include raised guide portions 290 which are configured to be received in corresponding guide grooves 292 formed on the outer surface of the inner sleeve 288. The reception of the guide portions 290 of the outer sleeve 278 in the corresponding guide grooves 292 in the inner sleeve 288 allows the inner sleeve 288 to slide inside the outer sleeve 278, while preventing rotation of the inner sleeve 288 relative to the outer sleeve 278. A spring 294 is disposed between the inner sleeve 288 and the flange portion 282 of the outer sleeve 278. The spring 294 biases the camming surfaces 286 of the inner sleeve 288 into engagement with the camming surfaces 284 of the control shaft 272 to, in turn, bias the thumb wheel 274 to automatically return to a neutral position thereof when released.

Thus, the thumb wheel 274 is movable to a forward position in which the drive assembly 200 operates to drive the wheel 110 in a forward direction to propel the stretcher 20 in the forward direction, and the thumb wheel 274 is movable to a reverse position in which the drive assembly 200 operates to drive the wheel 110 in a reverse direction to propel the stretcher 20 in the reverse direction. The handle post 84 may be marked with an indicia to provide a visual indication of the neutral position of the thumb wheel 274.

Illustratively, the drive motor 202 is Model No. M6030/G33, manufactured by Rae Corporation, the linear actuator 220 is Model No. LA22.1-130-24-01, manufactured by Linak Corporation, and the rotary switch 264 is Model No. RV6N502C-ND, manufactured by Precision Corporation.

FIGS. 15-17 show an alternative push-type switch assembly 300 for operating the drive motor 202. The push-type switch assembly 300 is coupled to the distal end 86 of the handle post 84 of the first push bar 80. The push-type switch assembly 300 includes a pressure sensitive, push-type switch 302 positioned inside the hollow tube 260 formed at the distal end 86 of the handle post 84. Control cables 304 of the push-type switch 302 are routed through the hollow tube 260 for connection to the controller 256. The push-type switch 302 includes a threaded portion 306 that is screwed into a threaded portion 308 formed on the inside surface of an outer sleeve 310. The outer sleeve 310 is configured to be press fitted into the hollow tube 260 of the handle post 84 as shown in FIGS. 16 and 17. The push-type switch 302 includes an input shaft 312 which is configured to be in engagement with a flexible dome-shaped cap 314. The flexible dome-shaped cap 314 is snap fitted over a flange portion 316 of the outer sleeve 310. The farther the input shaft 312 on the push-type switch 302 is pushed, the faster the drive motor 202 runs. A forward/reverse toggle switch 318 is mounted near a distal end 86 of the second push bar 82 to change the direction of the drive motor 202 as shown in FIG. 15*a*. Alternatively, the forward/reverse toggle switch 318 may be located at some other location—for example, the lower frame 26.

Thus, the forward/reverse toggle switch 318 is moved to a forward position in which the drive motor 202 operates to drive the wheel 110 in a forward direction to propel the stretcher 20 in the forward direction, and the forward/reverse toggle switch 318 is moved to a reverse position in which the drive motor 202 operates to drive the wheel 110 in a reverse direction to propel the stretcher 20 in the reverse direction. The speed of the drive motor 202, on the other hand, is determined by the extent to which the push-type switch 302 is pushed. Illustratively, the push-type switch 302 is of the type sold by Duncan Corporation.

Figure 18:
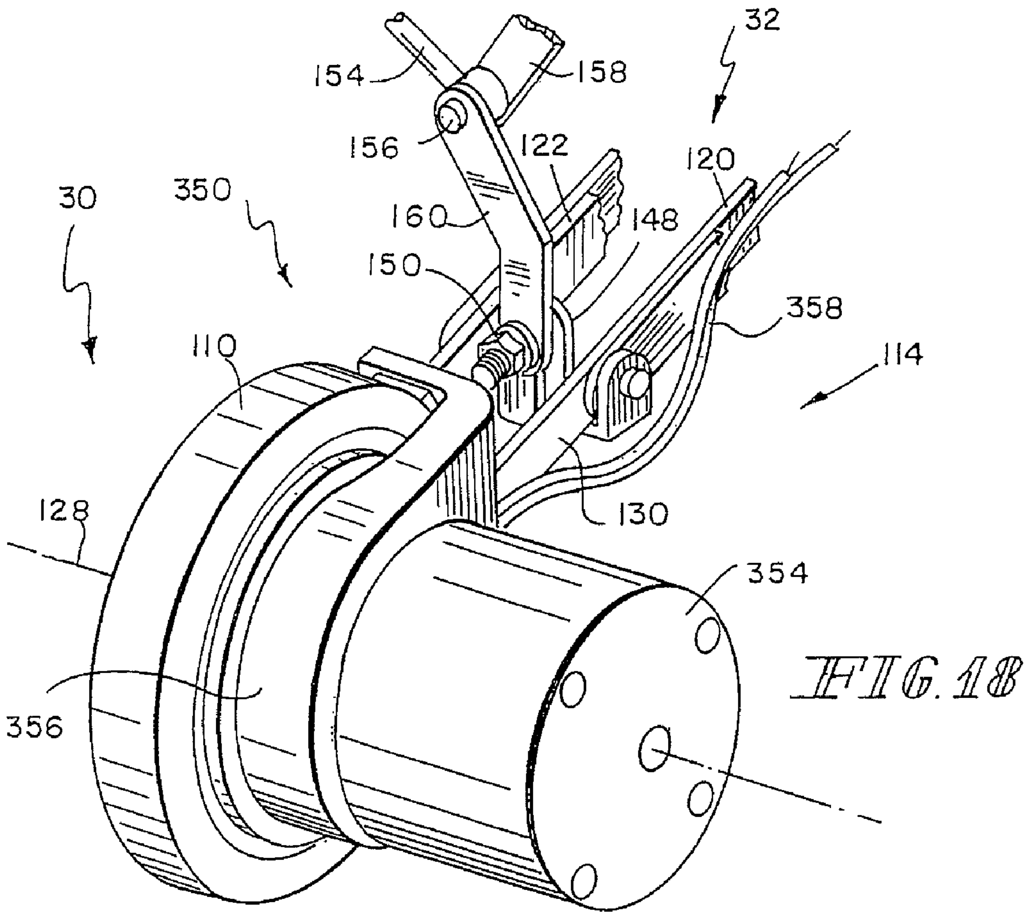
FIG. 18 is a perspective view of an alternative embodiment of the drive assembly drivingly couplable to a floor-engaging wheel for propelling the stretcher along the floor, and showing the wheel mounted directly on an output shaft of a drive motor coupled to the wheel-mounting bracket.
Figure 19:
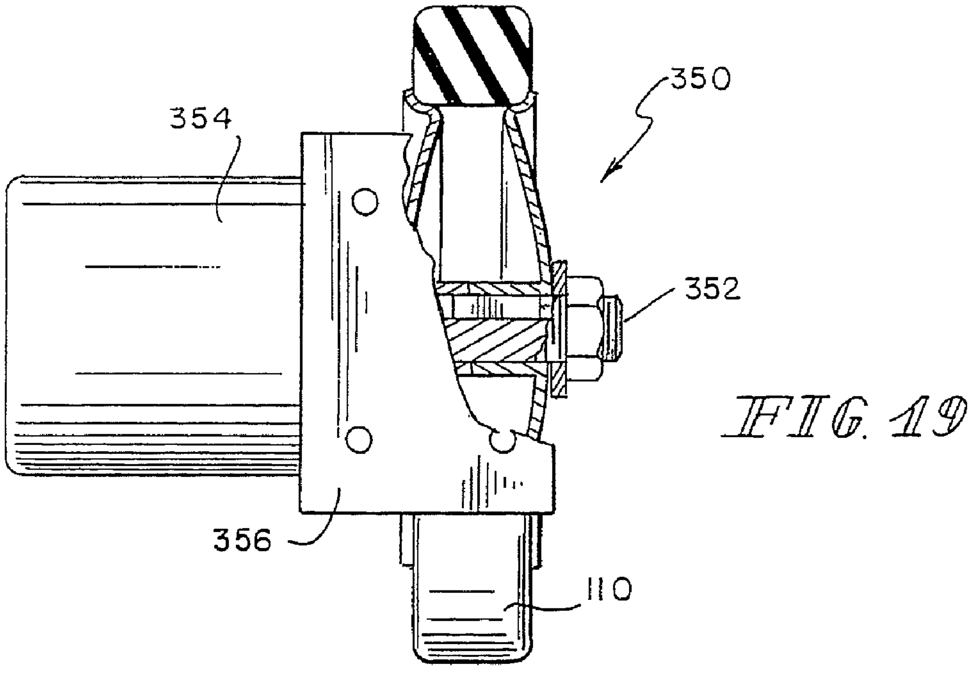
FIG. 19 is a sectional view of the drive motor and the wheel of FIG. 18 through the central axis of the motor output shaft.

FIGS. 18 and 19 show an alternative configuration of the drive assembly 350 drivingly couplable to the wheel 110 for propelling the stretcher 20 along the floor 62. As shown therein, the wheel 110 is mounted directly on an output shaft 352 of a drive motor 354. The drive motor 354 is, in turn, mounted to a bracket 356 coupled to the wheel-mounting bracket 114. Control cables 358 of the drive motor 354 are routed to the controller 256 along the wheel-mounting bracket 114. Illustratively, the drive motor 354 is of the type sold by Rockland Corporation.

Figure 20:
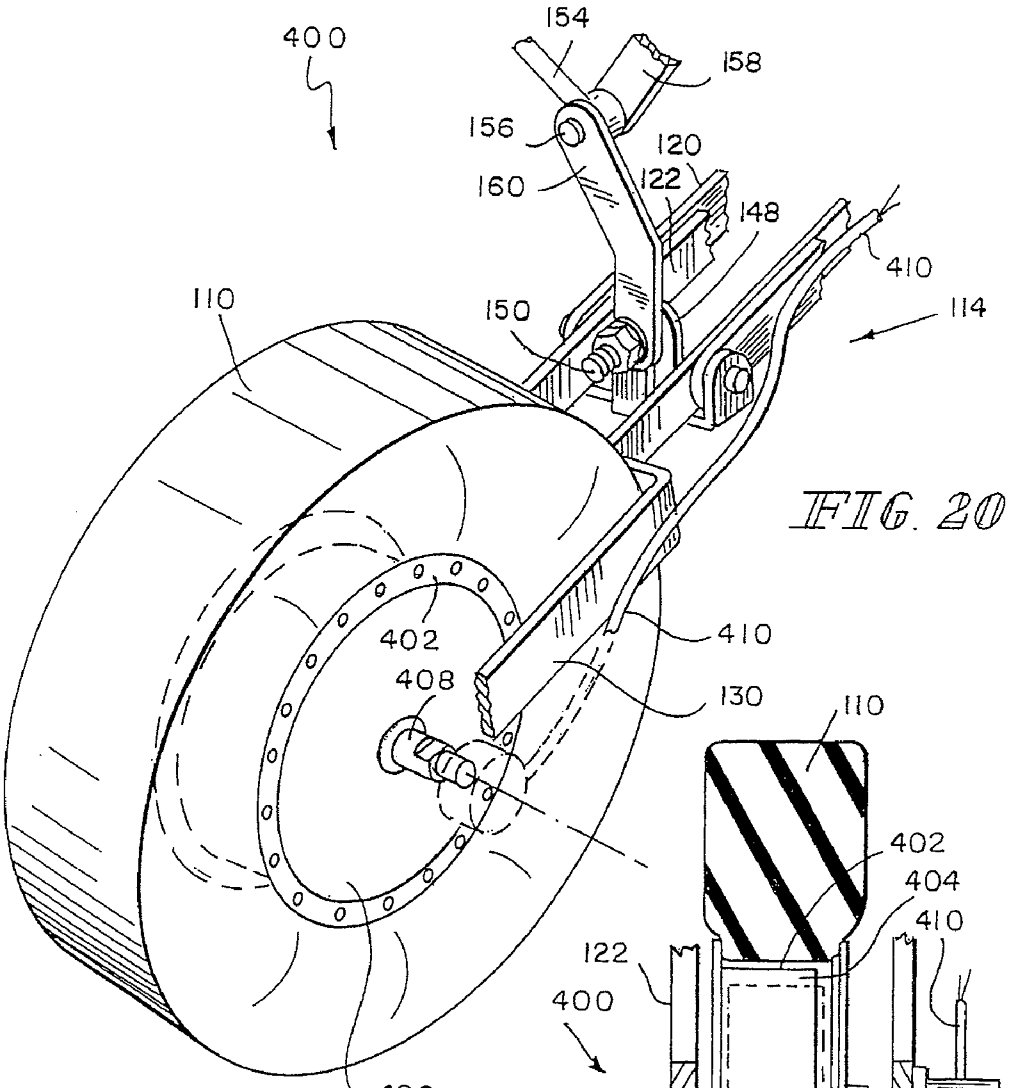
FIG. 20 is a perspective view of another alternative embodiment of the drive assembly drivingly couplable to a floor-engaging wheel for propelling the stretcher along the floor, showing the wheel mounted directly on a rim portion of a rotor of a drive motor, and further showing a stationary shaft of a stator of the drive motor fixed to the wheel-mounting bracket.
Figure 21:
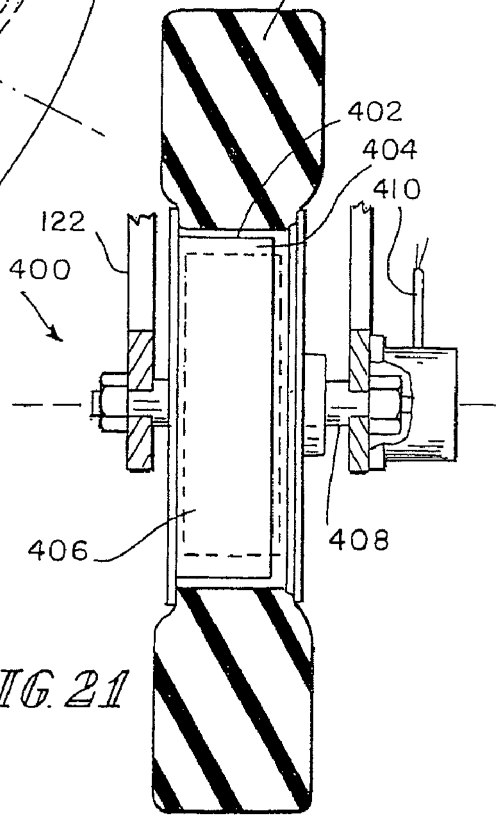
FIG. 21 is a sectional view of the drive motor and the wheel of FIG. 20 through the central axis of the stationary stator shaft.

FIGS. 19 and 20 show another alternative configuration of the drive assembly 400 drivingly couplable to the wheel 110 for propelling the stretcher 20 along the floor 62. As shown therein, the wheel 110 is mounted directly on a rim portion 402 of a rotor 404 of a hub-type drive motor 406. The stationary stator shaft 408 of the hub-type drive motor 406 is coupled to the wheel-mounting bracket 114. Control cables 410 of the drive motor 406 are routed to the controller 256 along the wheel-mounting bracket 114. Illustratively, the hub-type drive motor 406 is Model No. 80-200-48-850, manufactured by PML Manufacturing Company.

Although the invention has been described in detail with reference to a certain preferred embodiment, variations and modifications exist within the scope and spirit of the invention as described and as defined in the following claims.

The invention claimed is:

1. A patient support apparatus for transporting a patient along a floor, the patient support apparatus comprising a first frame, a second frame supported above the first frame and movable relative to the first frame, a push handle coupled to the second frame and movable between a push position and a storage position, a plurality of casters coupled to the first frame, a wheel supported with respect to the first frame and movable between a lowered position engaging the floor and a raised position spaced from the floor, a drive assembly coupled to the wheel and operable to drive the wheel to propel the patient support apparatus along the floor, a foot pedal coupled to the first frame and movable to raise and lower the wheel relative to the floor, elevation adjust pedals coupled to the first frame and movable to change an elevation of the second frame relative to the first frame, a controller operable to signal the drive assembly to drive the wheel, and a control coupled to the push handle and movable to provide a signal to the controller.

2. The patient support apparatus of claim 1, further comprising drive means for movably supporting the first frame relative to the second frame and the elevation adjustment pedals actuate the drive means.

3. The patient support apparatus of claim 2, wherein the drive means comprises at least one hydraulic cylinder.

4. The patient support apparatus of claim 3, wherein the at least one hydraulic cylinder comprises a first hydraulic cylinder adjacent a first end of the first frame and a second hydraulic cylinder adjacent a second end of the first frame.

5. The patient support apparatus of claim 2, wherein the drive means comprises at least one electromechanical actuator.

6. The patient support apparatus of claim 1, further comprising a shroud that covers the first frame and the shroud being configured to cover the wheel.

7. The patient support apparatus of claim 6, wherein the shroud is configured with a storage pan that is situated between a first side and a second side of the shroud.

8. The patient support apparatus of claim 1, further comprising an elongated shaft coupled to the foot pedal, rotation of the shaft by the foot pedal in a first direction results in lowering of the wheel, and rotation of the shaft by the foot pedal in a second direction results in raising of the wheel.

9. The patient support apparatus of claim 1, wherein movement of the foot pedal also brakes and unbrakes the plurality of casters.

10. The patient support apparatus of claim 1, wherein the push handle is movable relative to the second frame about a pivot axis.

11. The patient support apparatus of claim 1, wherein the drive assembly comprises a motor having an output shaft and the wheel is mounted on the output shaft.

12. The patient support apparatus of claim 1, further comprising a battery that is carried by the first frame and that provides power to the drive assembly.

13. The patient support apparatus of claim 1, wherein the drive assembly comprises a motor having a stator and a rotor and wherein the wheel is mounted on the rotor.

14. The patient support apparatus of claim 13, further comprising a wheel support that is movable relative to the first frame to raise and lower the wheel, the stator being coupled to the wheel support.

15. A patient support apparatus for transporting a patient along a floor, the patient support apparatus comprising a first frame, a second frame supported above the first frame and movable relative to the first frame, a plurality of casters coupled to the first frame, a wheel supported with respect to the first frame and movable between a lowered position engaging the floor and a raised position spaced from the floor, a drive assembly coupled to the wheel and operable to drive the wheel to propel the patient support apparatus along the floor, a foot pedal coupled to the first frame and movable to raise and lower the wheel relative to the floor, elevation adjust pedals coupled to the first frame and movable to change an elevation of the second frame relative to the first frame, and a rotary switch having a rotatable member that is rotatable from a neutral position in a first direction to provide a first signal associated with propelling the patient support apparatus forwardly and that is rotatable from the neutral position in a second direction to provide a second signal associated with propelling the patient support apparatus rearwardly.

16. The patient support apparatus of claim 15, further comprising a spring to bias the rotatable member toward the neutral position.

17. The patient support apparatus of claim 15, wherein a speed at which the patient support apparatus is propelled depends upon an amount that the rotatable member is rotated away from the neutral position.

18. A patient support apparatus for transporting a patient along a floor, the patient support apparatus comprising a first frame, a second frame supported above the first frame and movable relative to the first frame, a push handle coupled to the second frame and movable between a push position and a storage position, a plurality of casters coupled to the first frame, a wheel supported with respect to the first frame and movable between a lowered position engaging the floor and a raised position spaced from the floor, a drive assembly coupled to the wheel and operable to drive the wheel to propel the patient support apparatus along the floor, a foot pedal coupled to the first frame and movable to raise and lower the wheel relative to the floor, elevation adjust pedals coupled to the first frame and movable to change an elevation of the second frame relative to the first frame, and a control coupled to the push handle and coupled to a controller associated with the drive assembly.

* * * * *